(12) United States Patent
Hur et al.

(10) Patent No.: US 11,601,488 B2
(45) Date of Patent: Mar. 7, 2023

(54) DEVICE AND METHOD FOR TRANSMITTING POINT CLOUD DATA, DEVICE AND METHOD FOR PROCESSING POINT CLOUD DATA

(71) Applicant: LG Electronics Inc., Seoul (KR)

(72) Inventors: Hyejung Hur, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/225,559

(22) Filed: Apr. 8, 2021

(65) Prior Publication Data

US 2021/0329055 A1 Oct. 21, 2021

(30) Foreign Application Priority Data

Apr. 8, 2020 (KR) ........................ 10-2020-0042936

(51) Int. Cl.
*H04L 29/06* (2006.01)
*H04L 65/70* (2022.01)
*G06T 9/40* (2006.01)
*G06T 9/00* (2006.01)
*H04L 65/75* (2022.01)

(52) U.S. Cl.
CPC .............. *H04L 65/70* (2022.05); *G06T 9/001* (2013.01); *G06T 9/40* (2013.01); *H04L 65/75* (2022.05)

(58) Field of Classification Search
CPC ................. H04L 65/607; H04L 65/601; H04L 65/1006; H04L 65/1069; H04L 65/608; H04L 65/80; H04L 67/38; G06T 9/001; G06T 9/40; G06T 9/00; H04N 19/597; H04N 19/70; H04N 21/6437; H04N 13/168; H04N 13/16
See application file for complete search history.

(56) References Cited

U.S. PATENT DOCUMENTS

| | | | |
|---|---|---|---|
| 11,328,440 B2* | 5/2022 | Hur | G06T 17/00 |
| 2017/0347120 A1* | 11/2017 | Chou | H04N 19/147 |
| 2018/0063505 A1* | 3/2018 | Lee | G06T 3/0018 |
| 2019/0087978 A1* | 3/2019 | Tourapis | G06T 3/005 |
| 2019/0311499 A1* | 10/2019 | Mammou | G06T 9/00 |
| 2019/0311501 A1* | 10/2019 | Mammou | G06T 17/00 |
| 2019/0355152 A1* | 11/2019 | Li | G06T 3/4084 |
| 2020/0021844 A1* | 1/2020 | Yea | H04N 19/126 |
| 2020/0021856 A1* | 1/2020 | Tourapis | H04N 19/59 |

(Continued)

FOREIGN PATENT DOCUMENTS

| | | | | |
|---|---|---|---|---|
| KR | 20180071767 A | * | 6/2018 | ........... G06T 15/005 |
| KR | 1020190107611 | | 9/2019 | |
| KR | 1020190117287 | | 10/2019 | |

OTHER PUBLICATIONS

Yan Huang et al., "octree-Based Progressive Geometry Coding of Point Clouds" Eurographics Symposium on Point-Based Graphics (2006 (Year: 2006).*

(Continued)

*Primary Examiner* — Mekonen T Bekele
(74) *Attorney, Agent, or Firm* — Fish & Richardson P.C.

(57) ABSTRACT

Disclosed herein are a point cloud data transmission method including encoding point cloud data, and transmitting a bitstream containing the point cloud data, and a point cloud data processing method including receiving a bitstream containing point cloud data, and decoding the point cloud data.

16 Claims, 32 Drawing Sheets

(56) References Cited

U.S. PATENT DOCUMENTS

2020/0058164 A1    2/2020  Sarup
2020/0105025 A1    4/2020  Yes et al.
2020/0380765 A1*  12/2020  Thudor .................. G06T 17/10
2020/0394450 A1*  12/2020  Li ............................ G06T 7/60

OTHER PUBLICATIONS

Khaled Mammou et al. 'G-PCC codec description v2', ISO/IEC JTC1/SC29/WG11 N18189, Jan. 31, 2019. See pp. 2-17 and fig. 1 (Year: 2019).*

International Search Report and Written Opinion in International Appln. No. PCT/KR2021/002457, dated Jun. 17, 2021, 20 pages (with English translation).

* cited by examiner

FIG. 6
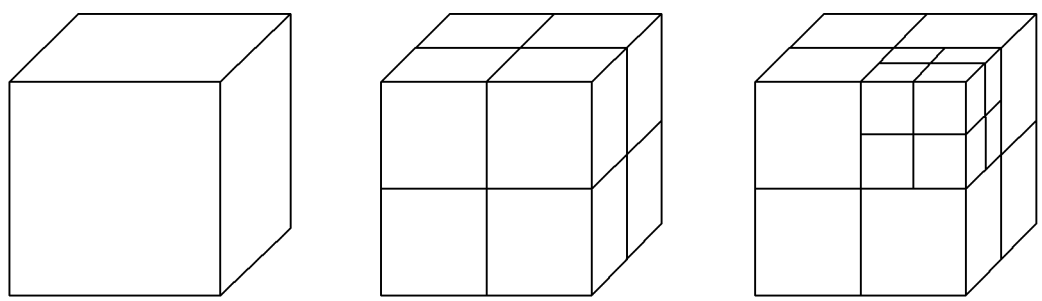
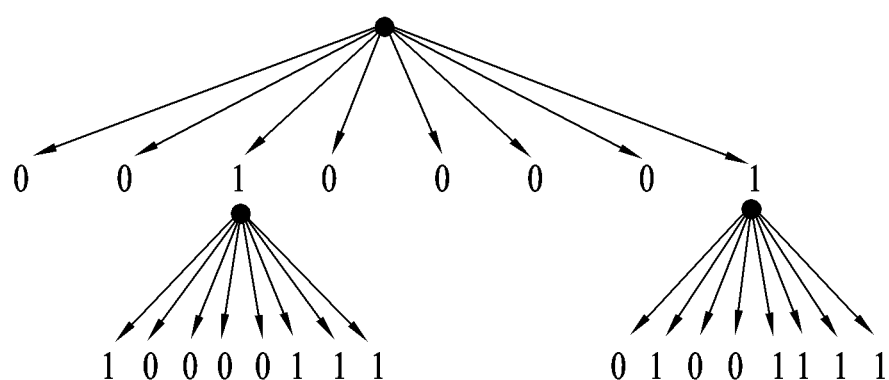

FIG. 7
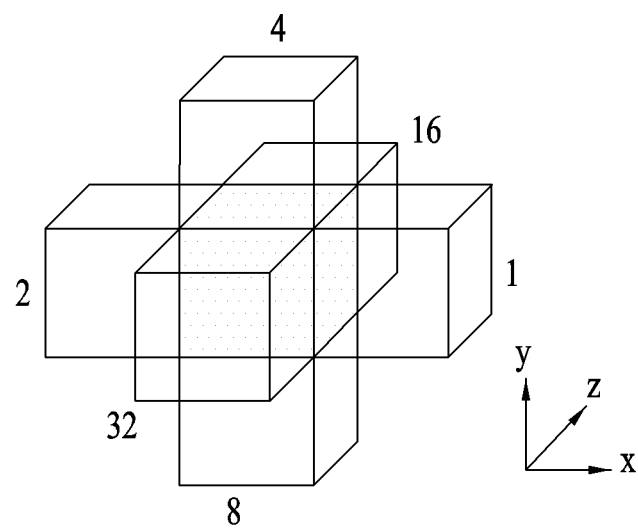
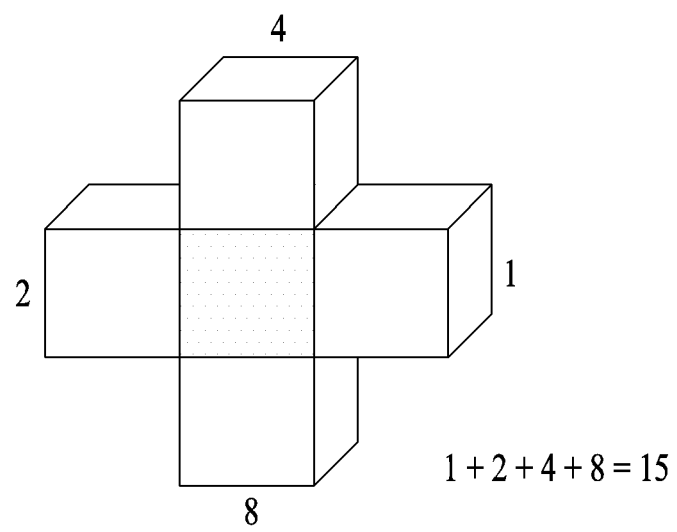
$1 + 2 + 4 + 8 = 15$

FIG. 26

| seq_parameter_set_rbsp( ) { | Descriptor |
|---|---|
| profile_idc | u(8) |
| profile_compatibility_flags | u(24) |
| ... | |
| sps_num_attribute_sets | ue(v) |
| for( i = 0; i< sps_num_attribute_sets; i++ ) { | |
|    attribute_dimension[ i ] | ue(v) |
|    attribute_instance_id[ i ] | ue(v) |
| ... | |
| nn_base_distance_calculation_method_type[i] | u(8) |
| if (nn_base_distance_calculation_method_type[i] == 0) { | |
|    nn_base_disatnce[i] | ue(v) |
| } | |
| nearest_neighbour_max_range[i] | ue(v) |
| nearest_neighbour_min_range[i] | ue(v) |
| nn_range_filtering_location_type[i] | u(8) |
| } | |
| ... | |
| byte_alignment( ) | |
| } | |

FIG. 27

| attribute_parameter_set( ) { | Descriptor |
|---|---|
|   aps_attr_parameter_set_id | ue(v) |
|   aps_seq_parameter_set_id | ue(v) |
|   ... | |
|   isLifting = ( attr_coding_type == 0 \|\| attr_coding_type == 2 ) ? 1 : 0 | |
|   if( isLifting ) { | |
|     lifting_num_pred_nearest_neighbours | ue(v) |
|     lifting_max_num_direct_predictors | ue(v) |
|     ... | |
|   different_nn_range_in_tile_flag | u(1) |
|     different_nn_range_per_lod_flag | u(1) |
|     if (!different_nn_range_per_lod_flag) { | |
|       nearest_neighbour_max_range | ue(v) |
|       nearest_neighbour_min_range | ue(v) |
|       nn_base_distance_calculation_method_type | u(8) |
|       if (nn_base_distance_calculation_method_type == 0) { | |
|       nn_base_disatnce | ue(v) |
|       } | |
|       nn_range_filtering_location_type | u(8) |
|     } else { | |
|       for( idx = 0; idx <= num_detail_levels_minus1; idx++ ) { | |
|         nearest_neighbour_max_range[idx] | ue(v) |
|         nearest_neighbour_min_range[idx] | ue(v) |
|         nn_base_distance_calculation_method_type[idx] | u(8) |
|         if (nn_base_distance_calculation_method_type[idx] == 0) { | |
|         nn_base_disatnce[idx] | ue(v) |
|         } | |
|         nn_range_filtering_location_type[idx] | u(8) |
|       } | |
|     } | |
|   } | |
| | ... |
|   byte_alignment( ) | |
| } | |

FIG. 28

| tile_parameter_set( ) { | Descriptor |
|---|---|
|   num_tiles | ue(v) |
|   for( i = 0; i < num_tiles; i++ ) { | |
|     tile_bounding_box_offset_x[ i ] | se(v) |
|     tile_bounding_box_offset_y[ i ] | se(v) |
|     ... | |
|     if (different_nn_range_in_tile_flag == true) { | |
|       nearest_neighbour_max_range[i] | ue(v) |
|       nearest_neighbour_min_range[i] | ue(v) |
|       nn_base_distance_calculation_method_type[i] | u(8) |
|       if (nn_base_distance_calculation_method_type[i] == 0) { | |
|         nn_base_disatnce[i] | ue(v) |
|       } | |
|       nn_range_filtering_location_type[i] | u(8) |
|       different_nn_range_in_slice_flag[i] | u(1) |
|       if (different_nn_range_in_slice_flag[i] == true) { | |
|         nearest_neighbour_offset_range_in_slice_flag[i] | u(1) |
|       } | |
|     } | |
|     ... | |
|   } | |
|   byte_alignment( ) | |
| } | |

FIG. 29

| | Descriptor |
|---|---|
| attribute_slice_header( ) { | |
|   ash_attr_parameter_set_id | ue(v) |
|   ash_attr_sps_attr_idx | ue(v) |
|   ash_attr_geom_slice_id | ue(v) |
|   … | |
|   if (different_nn_range_in_slice_flag == true) { | |
|     different_nn_range_per_lod_flag | u(1) |
|     if (!different_nn_range_per_lod_flag) { | |
|       if(nearest_neighbour_offset_range_in_slice_flag == false) { | |
|         nearest_neighbour_absolute_max_range | ue(v) |
|         nearest_neighbour_absolute_min_range | ue(v) |
|         nn_base_distance_calculation_method_type | u(8) |
|         if (nn_base_distance_calculation_method_type == 0) { | |
|           nn_base_disatnce | ue(v) |
|         } | |
|         nn_range_filtering_location_type | u(8) |
|       } else { | |
|         nearest_neighbour_max_range_offset | ue(v) |
|         nearest_neighbour_min_range_offset | ue(v) |
|         nn_base_distance_calculation_method_type | u(8) |
|         if (nn_base_distance_calculation_method_type == 0) { | |
|           nn_base_disatnce | ue(v) |
|         } | |
|         nn_range_filtering_location_type | u(8) |
|       } | |
|     } else { | |
|       if(nearest_neighbour_offset_range_in_slice_flag == false) { | |
|         for( idx = 0; idx <= num_detail_levels_minus1; idx++ ) { | |
|           nearest_neighbour_absolute_max_range[idx] | ue(v) |
|           nearest_neighbour_absolute_min_range[idx] | ue(v) |
|           nn_base_distance_calculation_method_type[idx] | u(8) |
|           if (nn_base_distance_calculation_method_type[idx] == 0) { | |
|             nn_base_disatnce[idx] | ue(v) |
|           } | |
|           nn_range_filtering_location_type[idx] | u(8) |
|         } | |
|       } else { | |
|         for( idx = 0; idx <= num_detail_levels_minus1; idx++ ) { | |
|           nearest_neighbour_max_range_offset[idx] | ue(v) |
|           nearest_neighbour_max_range_offset[idx] | ue(v) |
|           nn_base_distance_calculation_method_type[idx] | u(8) |
|           if (nn_base_distance_calculation_method_type[idx] == 0) { | |
|             nn_base_disatnce[idx] | ue(v) |
|           } | |
|           nn_range_filtering_location_type[idx] | u(8) |
|         } | |
|       } | |
|     } | |
|   } | |
|   … | |
|   byte_alignment( ) | |
| } | |

DEVICE AND METHOD FOR TRANSMITTING POINT CLOUD DATA, DEVICE AND METHOD FOR PROCESSING POINT CLOUD DATA

CROSS-REFERENCE TO RELATED APPLICATIONS

This application claims the benefit of Korean Patent Application No. 10-2020-0042936, filed on Apr. 8, 2020, which is hereby incorporated by reference as if fully set forth herein.

TECHNICAL FIELD

Embodiments relate to a method and device for transmitting and processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, in some embodiments, a method for transmitting point cloud data may include: encoding point cloud data including geometry and attribute, and transmitting a bitstream including the encoded point cloud data. In some embodiments, the geometry represents positions of points of the point cloud data and the attribute includes at least one of color and reflectance of the points. In some embodiments, the attribute is encoded based on one or more LODs (Level Of Details) that are generated by reorganizing the points. In some embodiments, one or more neighbor points of a point of each LOD are selected based on maximum nearest neighbor distance. In some embodiments, the bitstream includes information related to the maximum nearest neighbor distance.

In some embodiments, a method for processing point cloud data may include: receiving a bitstream including the point cloud data and decoding the point cloud data. In some embodiments, the point cloud data include geometry and attribute, the geometry represents positions of the point cloud data and the attribute includes at least one of color and reflectance of the points. In some embodiments, the attribute is decoded based on one or more LODs (Level Of Details) that are generated by reorganizing the points. In some embodiments, one or more neighbor points of a point of each LOD are selected based on maximum nearest neighbor distance and the bitstream includes information related to the maximum nearest neighbor distance.

In some embodiments, a device for processing point cloud data may include: a receiver to receive a bitstream including the point cloud data and a decoder to decode the point cloud data. In some embodiments, the point cloud data include geometry and attribute, the geometry represents positions of points of the point cloud data and the attribute includes at least one of color and reflectance of the points. In some embodiments, the attribute is decoded based on one or more LODs (Level Of Details) that are generated by reorganizing the points. In some embodiments, one or more neighbor points of a point of each LOD are selected based on maximum nearest neighbor distance and the bitstream includes information related to the maximum nearest neighbor distance.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 26 is an example of signaling information according to embodiments;

FIG. 27 shows an example of signaling information according to embodiments;

FIG. 28 shows an example of signaling information according to embodiments;

FIG. 29 shows an example of signaling information according to embodiments;

DETAILED DESCRIPTION

Best Mode

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
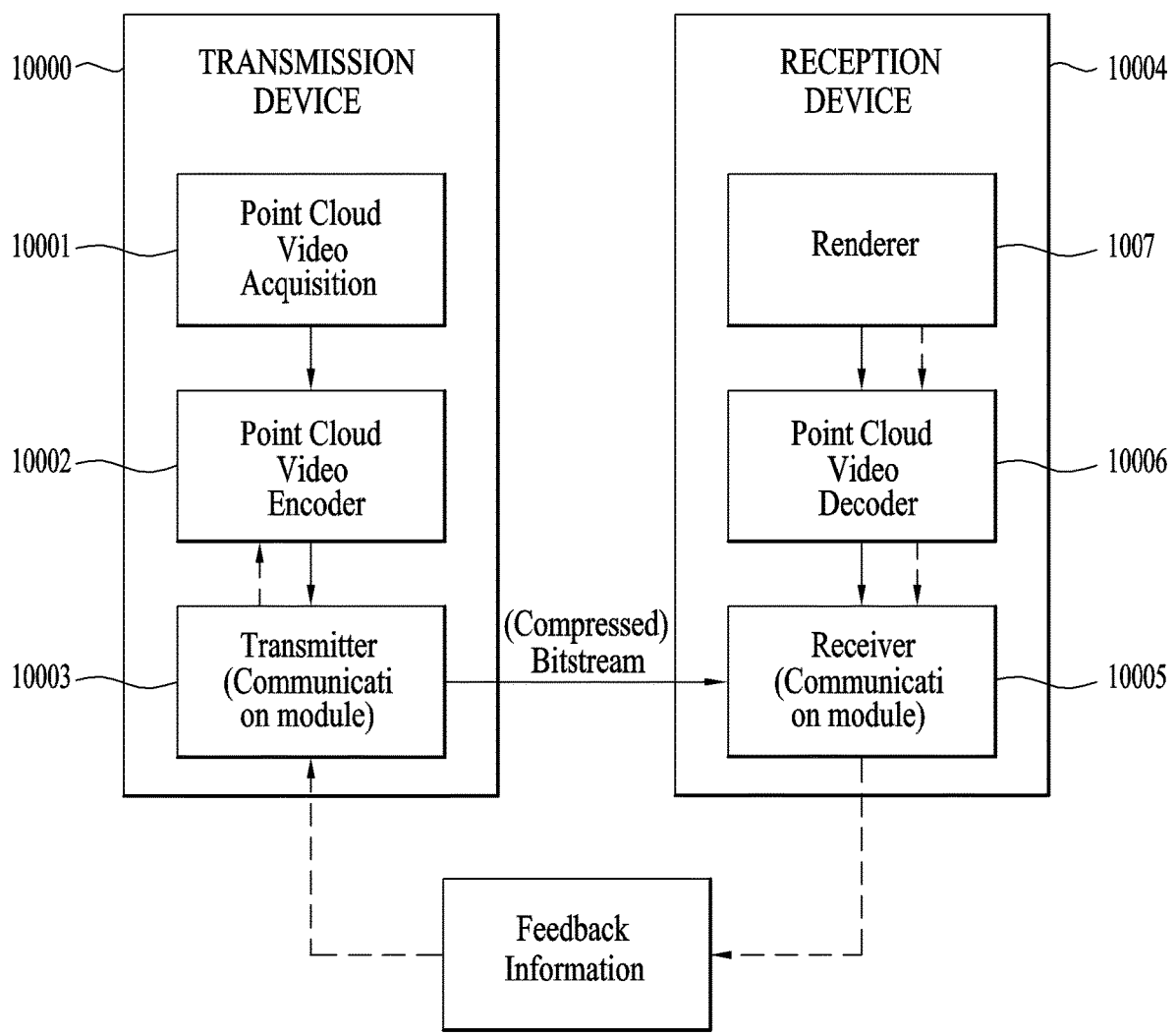
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
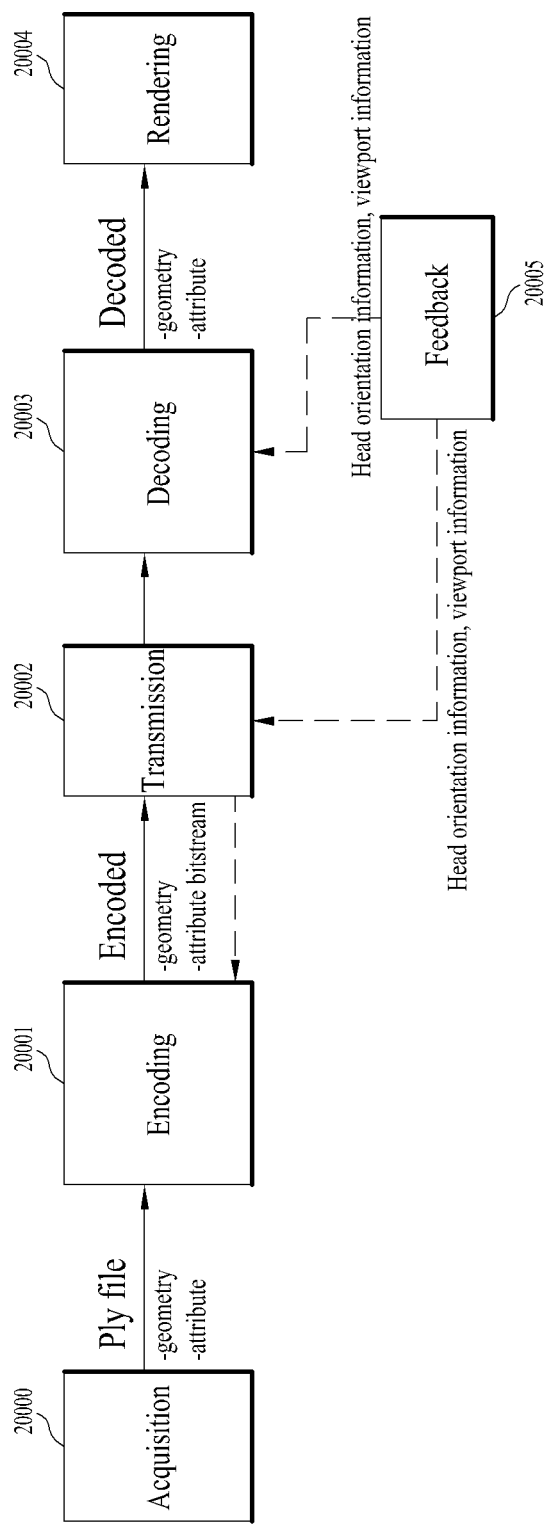
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
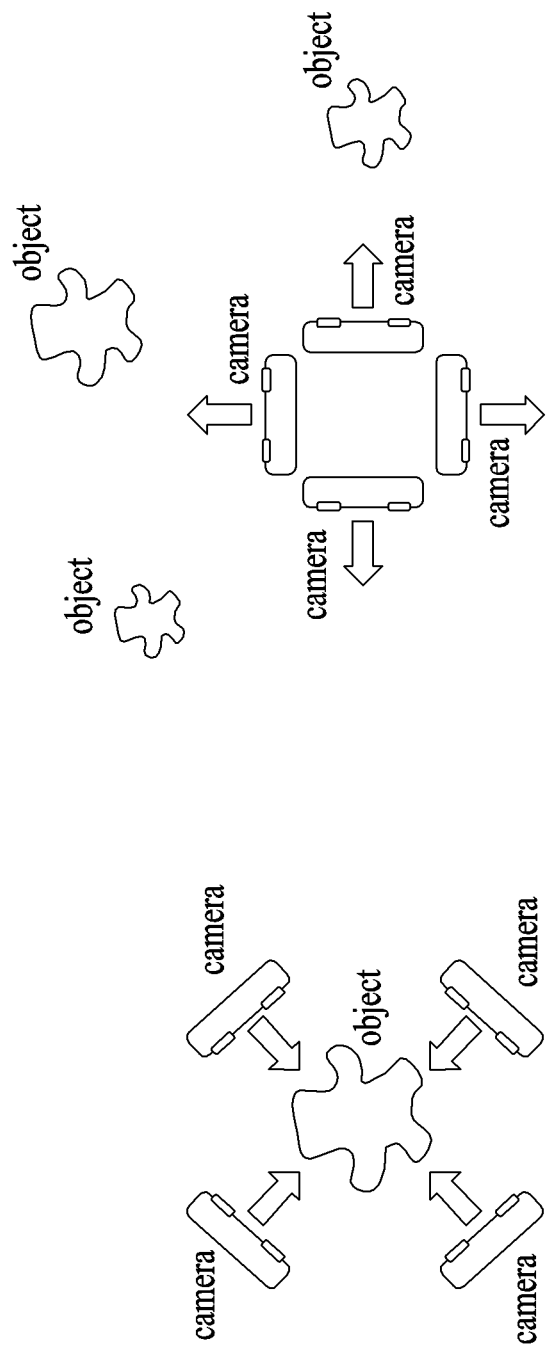
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
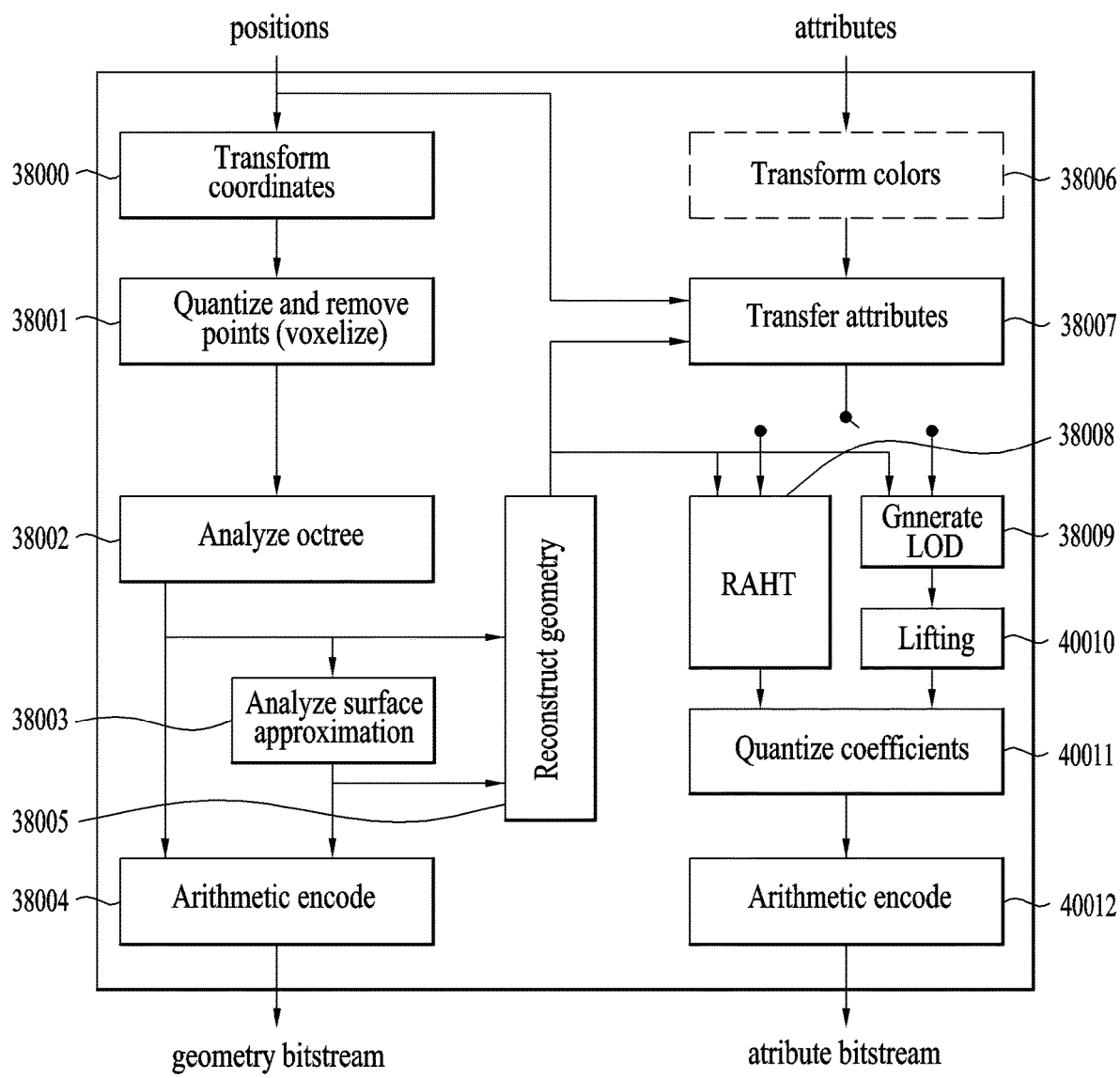
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
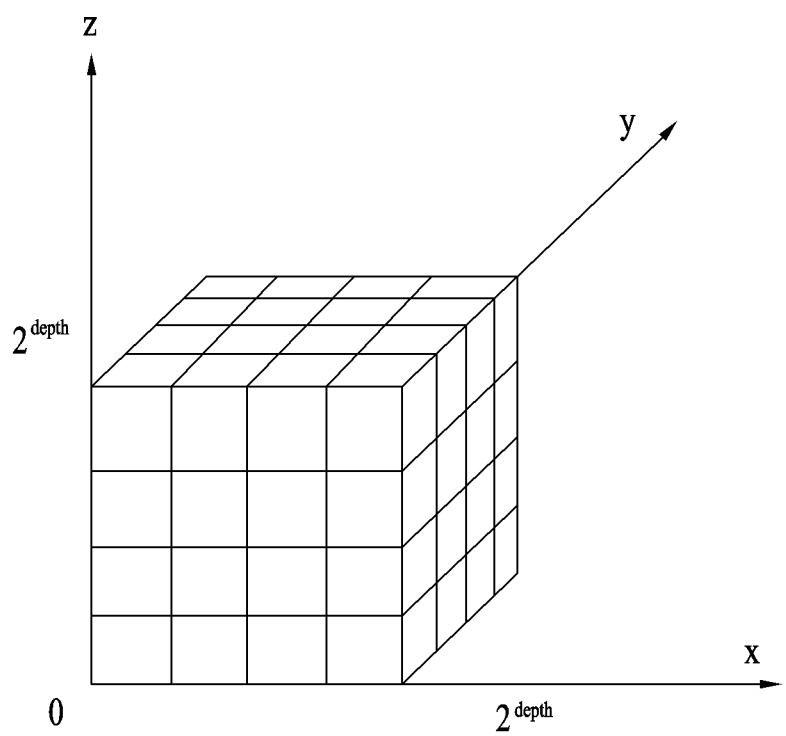
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d, 2^d, 2^d$). Here, $2^d$ may be set to a value constituting the smallest bounding box surrounding all points of the point cloud content (or point cloud video). Here, d denotes the depth of the octree. The value of d is determined in the following equation. In the following equation, ($x^{int}_n, y^{int}_n, z^{int}_n$) denotes the positions (or position values) of quantized points.

$$d = \mathrm{Ceil}(\mathrm{Log}\, 2(\mathrm{Max}(x_n^{int}, y_n^{int}, z_n^{int}, n=1,\ldots,N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\text{i)} \begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix}; \text{ii)} \begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix};$$

$$\text{iii)} \begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |

TABLE 2-1-continued

Triangles formed from vertices ordered 1, . . . , n

| n | triangles |
|---|---|
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
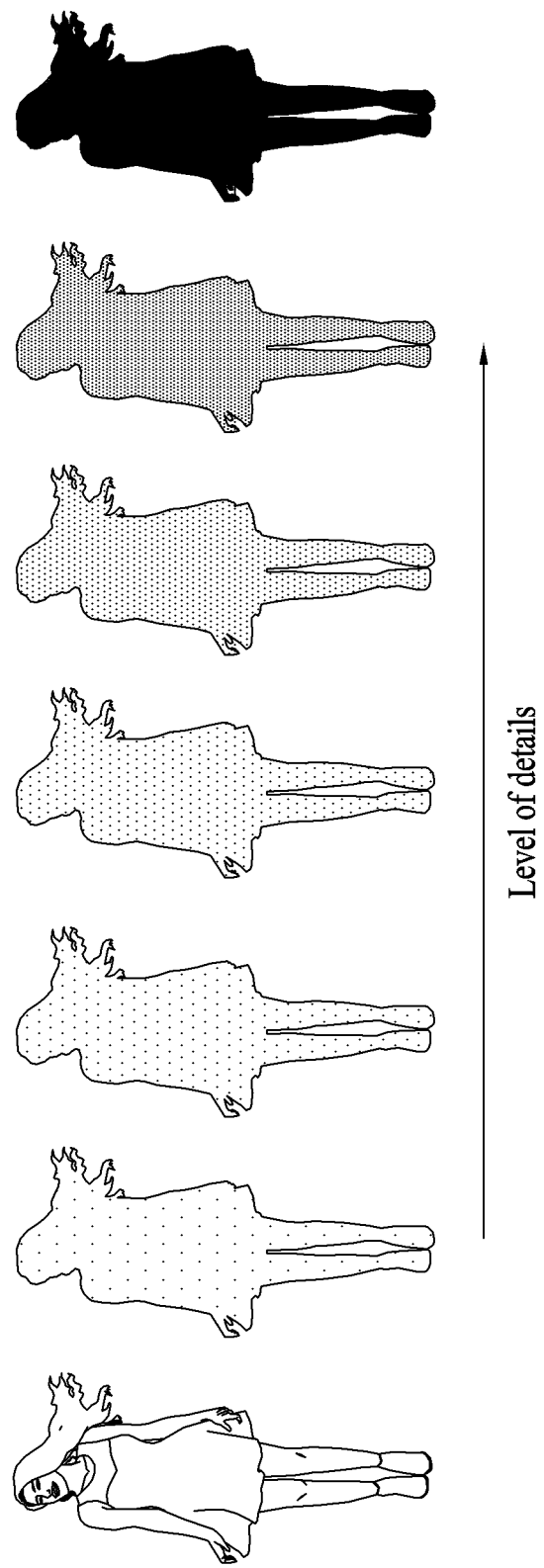
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
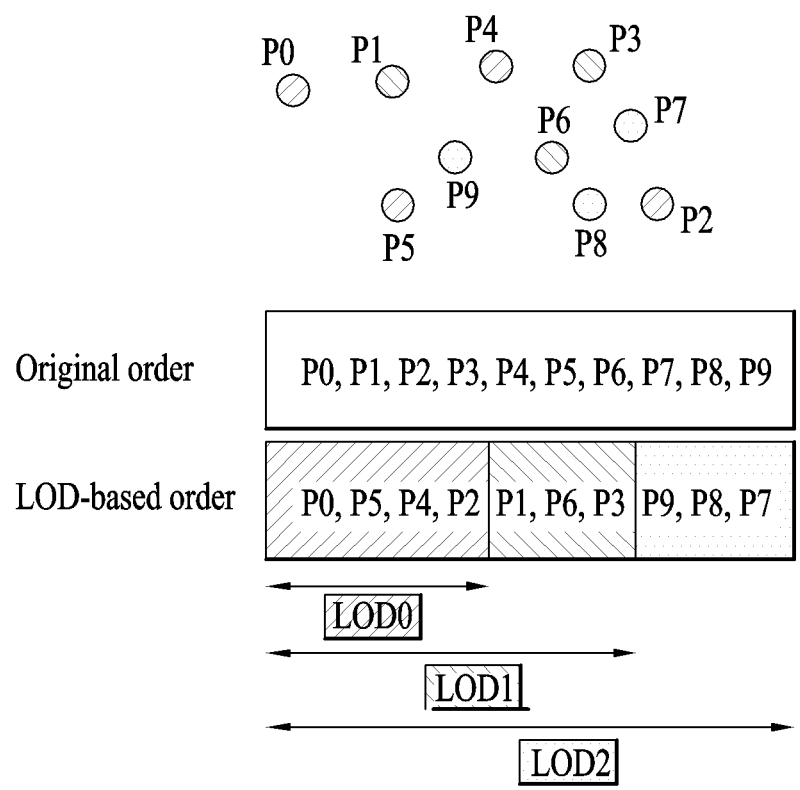
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE

Attribute prediction residuals quantization pseudo code

```
int PCCQuantization(int value, int quantStep) {
    if( value >=0) {
        return floor(value / quantStep + 1.0 / 3.0);
    } else {
        return -floor(-value / quantStep + 1.0 / 3.0);
    }
}
```

TABLE

Attribute prediction residuals inverse quantization pseudo code

```
int PCCInverseQuantization(int value, int quantStep) {
    if( quantStep ==0) {
        return value;
    } else {
        return value * quantStep;
    }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix},$$

$$T_{w1w2} = \frac{1}{\sqrt{w1+w2}} \begin{Bmatrix} \sqrt{w1} & \sqrt{w2} \\ -\sqrt{w2} & \sqrt{w1} \end{Bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = t_{w1000w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
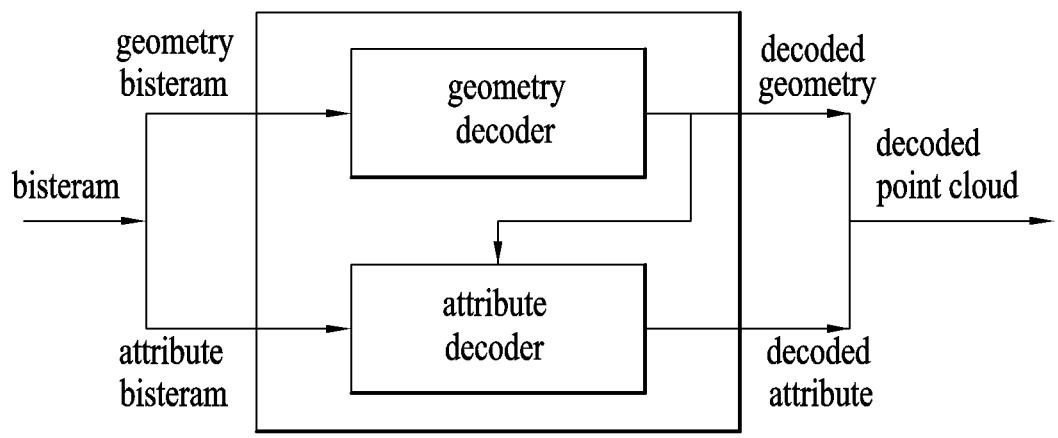
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
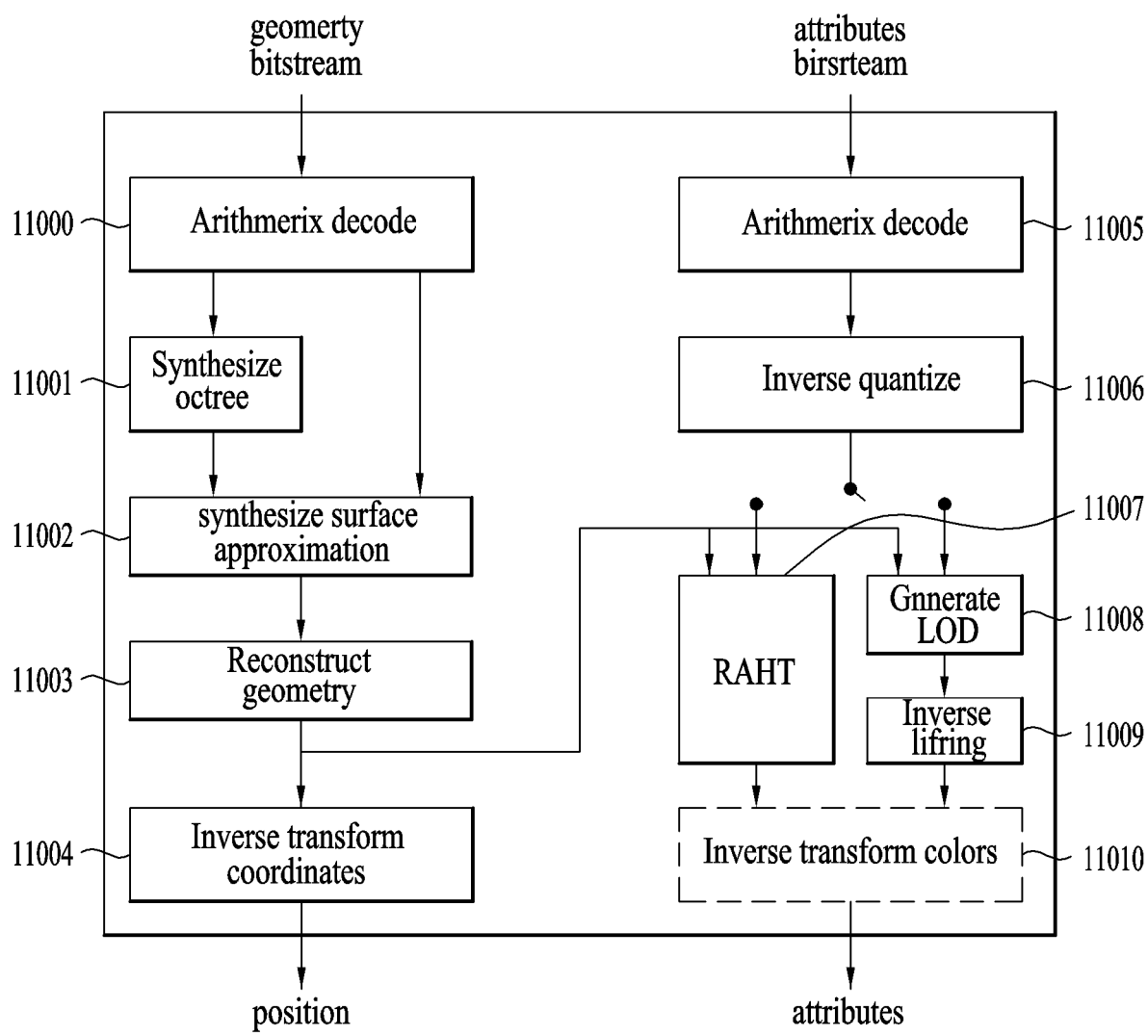
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
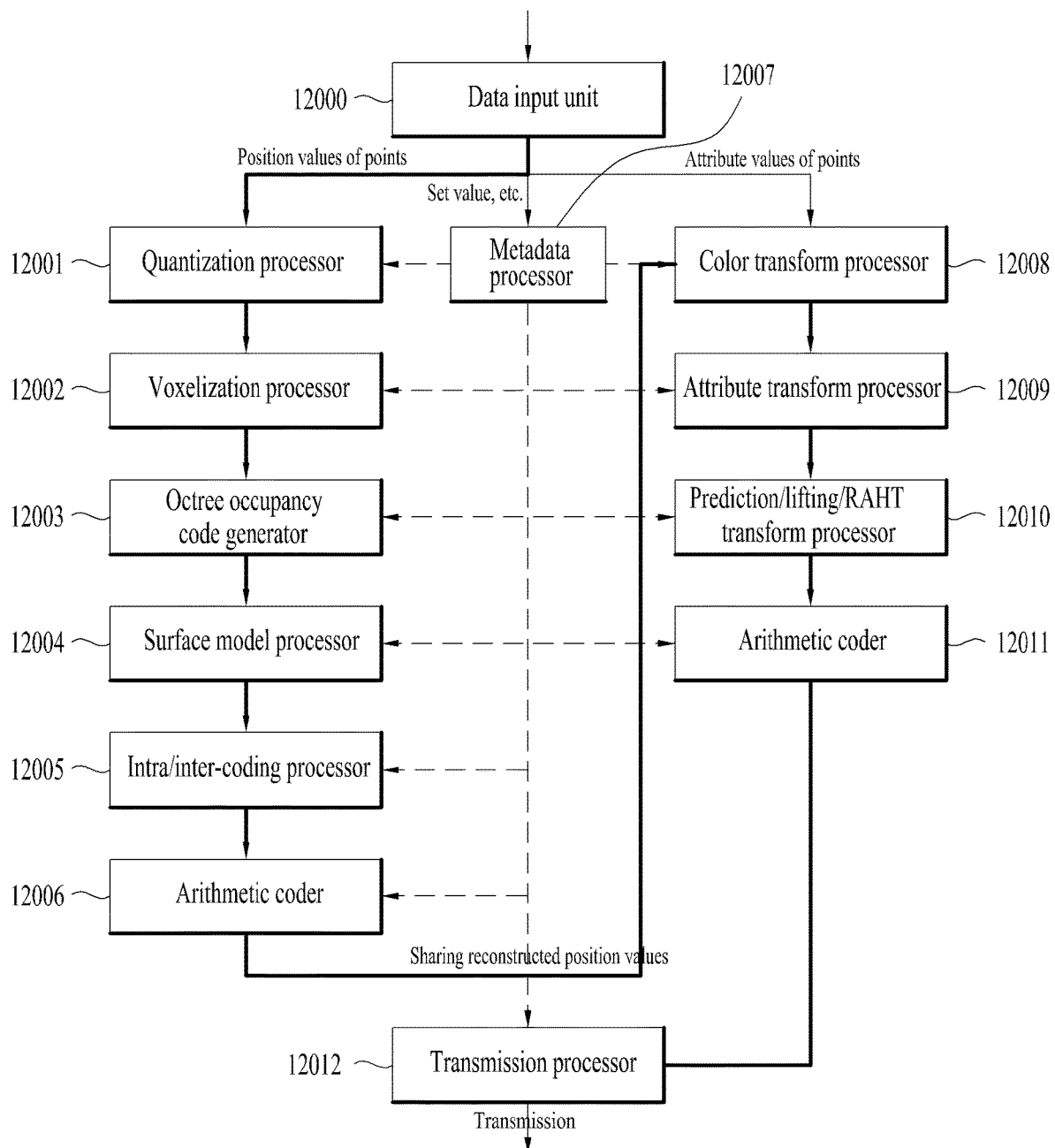
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom0$^0$ and one or more attribute bitstreams Attr0$^0$ and Attr1$^0$.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
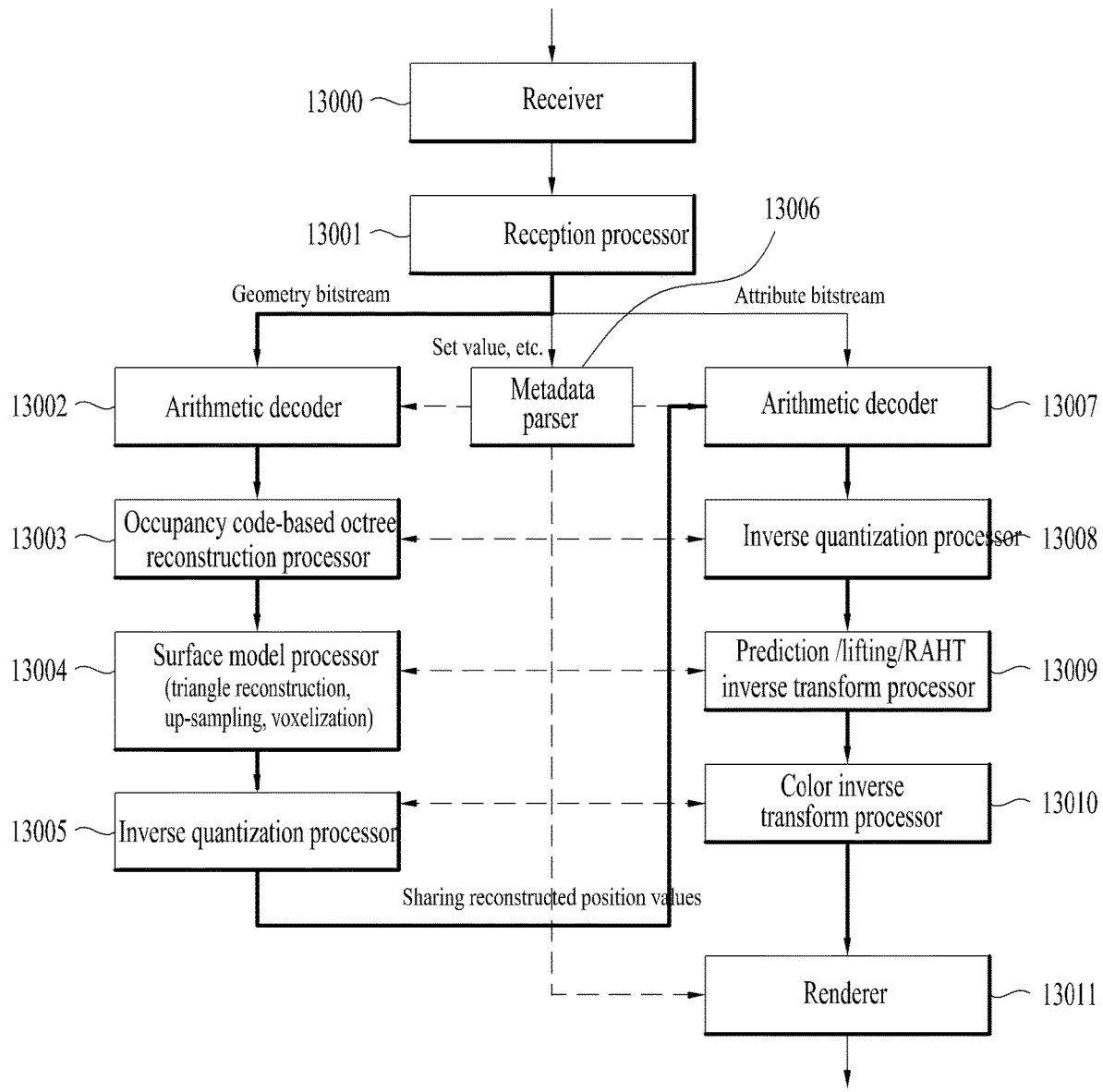
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
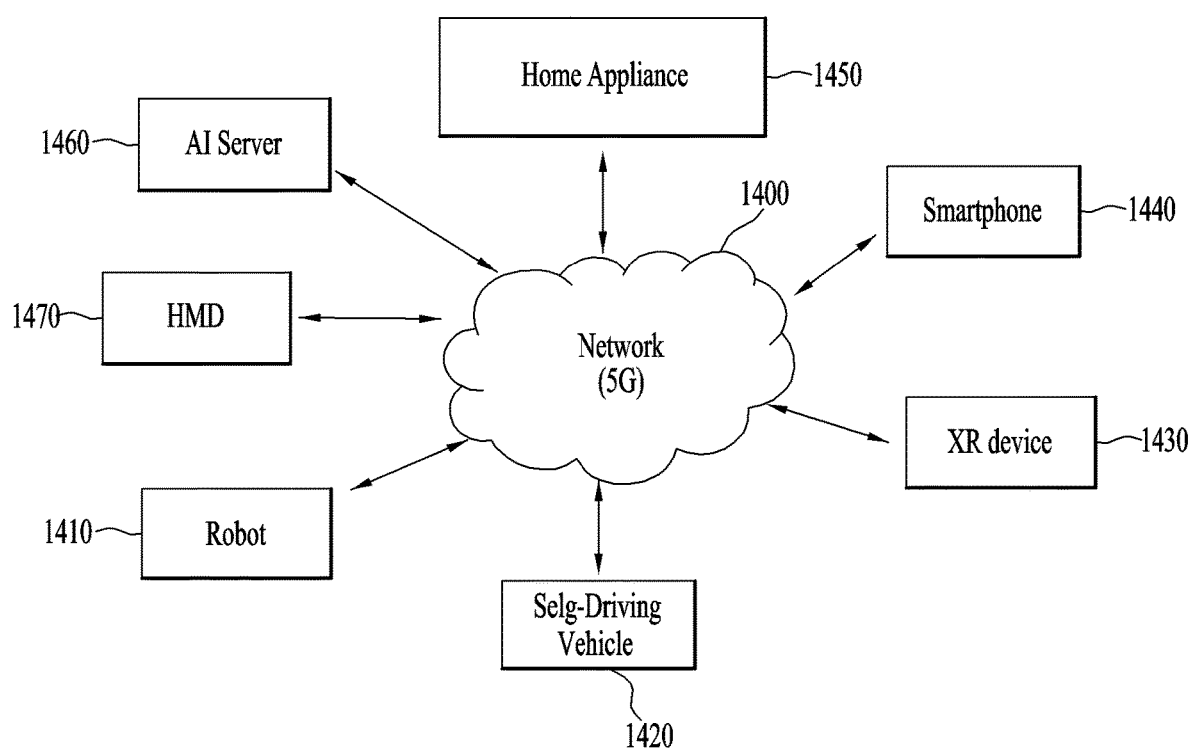
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described with reference to FIGS. 1 to 14, the point cloud processing device (for example, the transmission device or the point cloud encoder described in FIGS. 1, 12, and 14) according to the embodiments performs attribute encoding selectively using RAHT coding, prediction transform coding, and lifting transform coding, or a combination of one or more of the coding techniques according to the point cloud content. For example, RAHT coding and lifting transform coding may be used for lossy coding, which compresses point cloud content data to a significant degree. The prediction transform coding may be used for lossless coding.

As described above, the point cloud encoder according to the embodiments may generate a predictor for a point and perform prediction transform coding to set a predicted attribute (or predicted attribute value) of each point. According to embodiments, the prediction transform coding and lifting transform coding calculate a distance (or position) of each neighbor point based on the position of a point (hereinafter referred to as a target point) stored within a neighboring range of a point cloud. The calculated distance is used as a reference or reference weight to predict an attribute (e.g., color, reflectance, etc.) of the target point or to update the attribute (or predicted attribute) of the target point when the distance to the neighbor point is changed. The following equation represents an attribute of the target point predicted based on neighbor points.

$$P = \frac{[(d_2 d_3) \ll \text{shift}]C_1}{d_1 d_2 + d_2 d_3 + d_3 d_1} + \frac{[(d_3 d_1) \ll \text{shift}]C_2}{d_1 d_2 + d_2 d_3 + d_3 d_1} + \quad \text{[Equation 1]}$$

In the equation above, P denotes the predicted attribute of the target point, and d1, d2, and d3 denote the distances to each of the three neighbor points of the target point. The respective distances are combined and used as a reference weight. C1, C2, and C3 (not shown in the equation) denote the attributes of the respective neighbor points. Shift is a parameter used to adjust the magnitude of the average energy or power of the points. The value of shift is controlled by the hardware voltage operating range of the encoder or decoder.

According to embodiments, the point cloud encoder may change the above-described reference weight in consideration of a correlation between points (e.g., neighbor points). In particular, the point cloud encoder uses a correlated weight calculated by changing the above-described reference weight according to a correlation combining method in order to highlight the characteristic value at the distances to the neighbor points of the target point. Accordingly, the point cloud encoder may secure a performance gain proportional to the correlation between points. In addition, the point cloud encoder may generate a predictor in consideration of a correlation degree without changing the structures of RAHT coding, prediction transform coding, and lifting transform coding described with reference to FIGS. 1 to 14.

Figure 15:
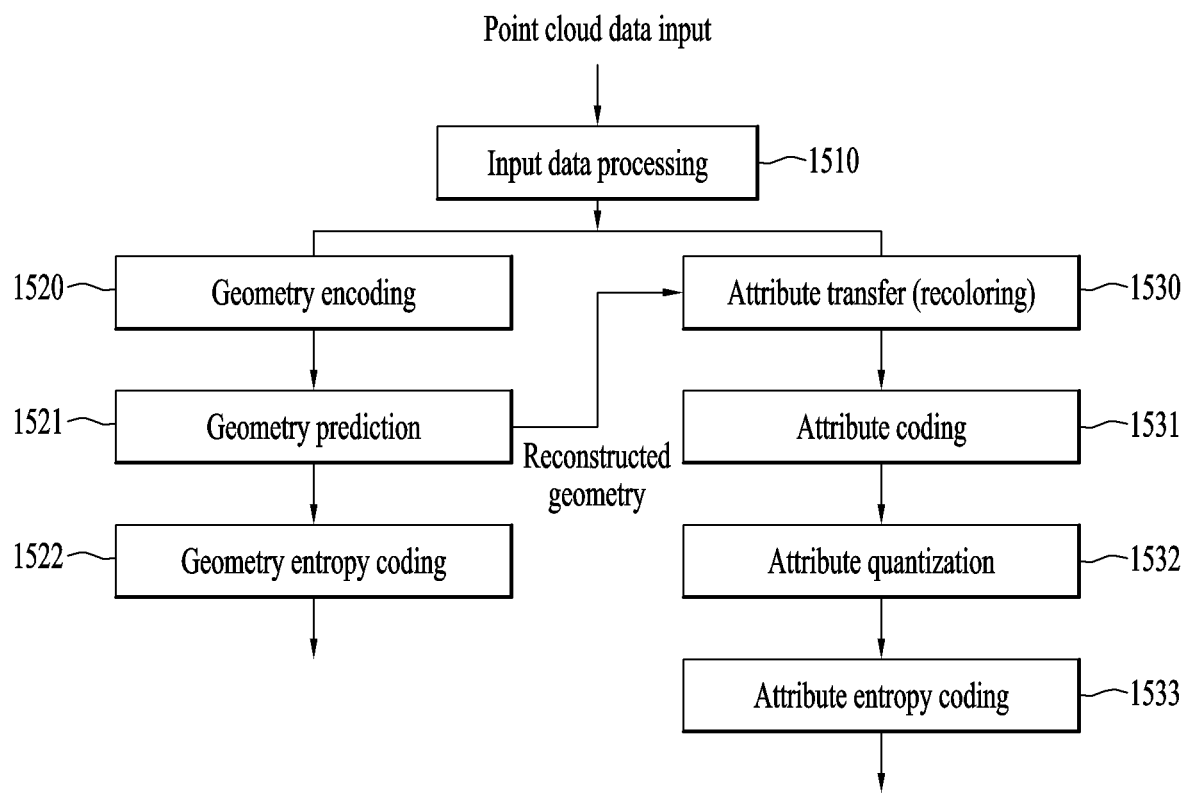
FIG. 15 is a flowchart illustrating an operation of a point cloud transmission device according to embodiments.

FIG. 15 is a flowchart illustrating an operation of a point cloud transmission device according to embodiments.

As described above with reference to FIGS. 1 to 14, the point cloud transmission device (for example, the transmission device of FIG. 1, the point cloud encoder of FIG. 4, and the transmission device of FIG. 12) receives input point cloud data and processes the input data (1510). The input data includes geometry and/or an attribute. According to embodiments, the geometry is information indicating positions of points in a point cloud, and the attribute is information corresponding to at least one of a color and/or reflectance of each point. According to embodiments, the geometry may be used as a concept involving the positions of a single point or all positions of a plurality of points. According to embodiments, the attribute may be used as a concept involving not only the color (e.g., R value of RGB) or reflectance of a single point, but also the color and/or reflectance of a plurality of points. Geometry according to embodiments may be represented by parameters of at least one coordinate system, for example, as a Cartesian coordinate system, a cylindrical coordinate system, or a spherical coordinate system. Accordingly, the point cloud transmission device (e.g., the coordinate transformer 40000 described with reference to FIG. 4) may transform the received geometry information into information on the coordinate system in order to express the position of each point indicated by the input geometry information as a position in the 3D space. The coordinate system according to the embodiments is not limited to the above-described example. In addition, the point cloud transmission device (e.g., the quantizer 40001 described with reference to FIG. 4) may quantize geometry information expressed in the coordinate system and generate transformed quantized geometry information. For example, the point cloud transmission device may apply one or more transforms, such as position transform and/or rotation transform, to the positions of the points indicated by geometry information, and perform quantization by dividing the transformed geometry information by a quantization value. The quantization value according to embodiments may vary based on a distance between a coding unit (e.g., a tile, a slice, etc.) and the origin of the coordinate system or an angle from a reference direction. According to embodiments, the quantization value may be a preset value. When quantization is performed, one or more points may have the same position. These points are called duplicated points. That is, one or more points may have the same quantized positions but different attributes. The point cloud transmission device may remove duplication by combining the duplicated points into one point (duplicated points removal), and information on a plurality of attributes associated with the combined point is transferred to an attribute transfer module for attribute encoding. The point cloud transmission device (e.g., the quantizer 40001 of FIG. 4) may perform quantization and/or duplicate point removal, and then perform voxelization of allocating attributes to the remaining points. The voxelization is a process of grouping points into voxels. The detailed process is the same as described with reference to FIG. 4 and thus description thereof will be skipped. In addition, the point cloud transmission device may transform the characteristics (e.g., color) of the attributes. For example, when the attribute is a color, the point cloud transmission device may transform the color space of the attribute (from RGB to YCbCr or vice versa). Each of sub-components (e.g., luma and chroma) of the attribute is processed independently.

According to embodiments, the point cloud transmission device may partition point cloud data into tiles in a 3D space and into slices in order to store point information about the point cloud data. A tile is a (3D) rectangular parallelepiped in a bounding box (for example, the bounding box described with reference to FIG. 5). The bounding box may include one or more tiles. One tile may fully or partially overlap another tile. One tile may include one or more slices. One slice is a set of points and is expressed as a series of syntax elements representing all or part of the encoded point cloud data. One slice may or may not have dependencies on other slices. The point cloud transmission device according to embodiments may include a spatial partitioner configured to partition the point cloud data.

According to the embodiments, the point cloud transmission device performs geometry encoding (or geometry coding) on the geometry (1520). The point cloud transmission device may perform at least of the operations of the coordinate transformer 40000, the quantizer 40001, the octree analyzer 40002, the surface approximation analyzer 40003, the arithmetic encoder 40004, and the geometry reconstructor (Reconstruct geometry) 40005 described with reference to FIG. 4. In addition, the point cloud transmission device according to the embodiments may perform at least of the operations of the data input unit 12000, the quantization processor 12001, the voxelization processor 12002, the octree occupancy code generator 12003, and the surface model processor 12004, the intra/inter-coding processor 12005, the arithmetic coder 12006, and the metadata processor 12007 described with reference to FIG. 12.

According to embodiments, geometry encoding may include, but is not limited to, at least one of octree-based octree geometry encoding and trisoup geometry encoding. The geometry encoding is the same as that described with reference to FIG. 4, and thus description thereof is skipped. The octree geometry encoding generates an octree to represent a voxel. The octree represents points matching the voxel based on an octal tree structure. The voxel and octree are the same as those described with reference to FIGS. 5 and 6, and thus a detailed description thereof is skipped.

The point cloud transmission device predicts geometry information (1521). The point cloud transmission device may perform quantization on the encoded geometry and calculate a predicted value (or predicted geometry information) based on a quantization value of a neighbor coding unit. In addition, the point cloud transmission device may generate a reconstructed geometry based on the predicted geometry information and the residual information reconstructed from the quantized geometry. The reconstructed geometry is provided for attribute encoding through additional processing such as filtering.

The point cloud transmission device (e.g., the arithmetic encoder 40004 of FIG. 4) performs geometry entropy encoding on the quantized geometry (1522). According to embodiments, the entropy encoding may include exponential Golomb, context-adaptive variable length coding (CAVLC), and context-adaptive binary arithmetic coding (CABAC).

The point cloud transmission device (e.g., the attribute transformer 40007 of FIG. 4) performs attribute transfer (recoloring) for attribute encoding (1530). The point cloud transmission device according to the embodiments may receive the reconstructed geometry, the geometry, and the attribute as inputs, and determine an attribute value that minimizes attribute distortion.

The point cloud transmission device performs attribute coding (1531). According to embodiments, the point cloud processing device performs attribute coding (or attribute encoding), selectively using RAHT coding, predicting transform coding, and lifting transform coding, or using a combination of one or more the coding schemes according to the point cloud content. For example, the RAHT coding and the lifting transform coding may be used for lossy coding that significantly compresses point cloud content data. The predicting transform coding may be used for lossless coding. The point cloud transmission device according to the embodiments may perform at least one of the operations of the color transformer 40006, the attribute transformer 40007, the RAHT transformer 40008, the LOD generator 40009, the lifting transformer 40010, and the coefficient quantizer 40011, and/or the arithmetic encoder 40012 described with reference to FIG. 4. In addition, the point cloud transmission device may perform at least one of the operations of the color processor 12008, the attribute transform processor (or attribute transform processor) 12009, the prediction/lifting/RAHT transform processor 12010, and the arithmetic coder 12011 described with reference to FIG. 12.

The point cloud transmission device performs attribute quantization (1532). The point cloud transmission device may receive the transformed residual attribute of the encoded attribute and generate a transformed quantized residual attribute based on a quantization value.

The point cloud transmission device (e.g., the arithmetic coder 12011 of FIG. 12) performs attribute entropy coding (1533). The point cloud transmission device may receive the transformed quantized residual attribute information, perform entropy encoding thereon, and output an attribute information bitstream. The entropy coding according to the embodiments may include any one or more of exponential Golomb, CAVLC, and CABAC, but is not limited thereto.

Figure 16:
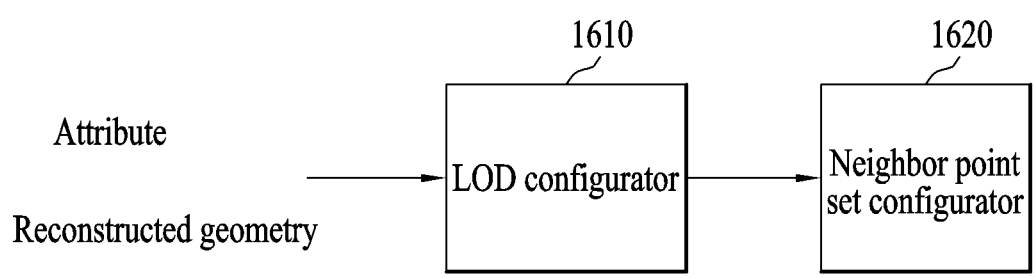
FIG. 16 is a block diagram of a point cloud transmission device according to embodiments.

FIG. 16 is a block diagram of a point cloud transmission device according to embodiments.

The point cloud transmission device (e.g., the point cloud transmission device described with reference to FIG. 15) performs attribute coding. According to embodiments, the attribute coding is generated based on LOD. As described with reference to FIGS. 4 and 8, the LOD may be generated by reorganizing points distributed in a 3D space into a set of refinement levels. According to embodiments, the LOD may include one or more points distributed at regular intervals. As described above, the LOD according to the embodiments is a degree of the detail of the point cloud content. Therefore, as a level indicated by the LOD (or LOD value) is lowered, the detail of the point cloud content is degraded. As the level indicated by the LOD is raised, the detail of the point cloud content is enhanced. According to embodiments, a point cloud encoder (e.g., the point cloud encoder of FIG. 4) and a point cloud decoder (e.g., the point cloud decoder of FIG. 11) may generate LODs to increase an attribute compression rate. This is because points with similar attributes is highly likely to be in the neighborhood of a target point, and thus the residual value between a predicted attribute obtained through neighbor points having similar attributes and the attribute of the target point is highly likely to be close to zero. Accordingly, the point cloud encoder and the point cloud decoder may generate an LOD to select an appropriate neighbor point that may be used in predicting an attribute.

As shown in the figure, the point cloud transmission device includes an LOD configurator 1610 and a neighbor point set configurator 1620. The LOD configurator 1610 may perform the same or similar operation as the LOD generator 40009. That is, as shown in the figure, the LOD configurator 1610 may receive attributes and reconstructed geometry, and configure one or more LODs based on the received attributes and reconstructed geometry.

According to embodiments, the LOD configurator 1610 may configure the LODs using one or more methods. As described above, the point cloud decoder (e.g., the point cloud decoder described with reference to FIGS. 10 and 11) should also generate LODs. Accordingly, information related to one or more LOD configuration methods (or LOD generation methods) according to the embodiments is included in a bitstream generated according to geometry encoding and attribute encoding. The LOD output from the LOD configurator 1610 is transmitted to at least one of the prediction transformer/inverse transformer and the lifting transformer/inverse transformer.

The LOD configurator 1610 may generate an LOD based on one or more methods capable of maintaining a certain interval between points while reducing the complexity of calculation of the distance between the points in generating a LOD1 set.

According to embodiments, the LOD configurator 1610 may configure the LOD based on the Morton codes of points. As described above, a Morton code is generated by representing the coordinate values (e.g. (x, y, z)) indicating the 3D positions of all points as bit values, and mixing the bits.

According to embodiments, the LOD configurator 1610 may generate a Morton code of each point based on the reconstructed geometry and may organize the respective points in an ascending order based on the Morton code. The order of points organized in ascending order of the Morton code may be referred to as a Morton order. The LOD configurator 1610 may configure the LOD by performing sampling on the points organized in the Morton order. The LOD configurator may perform sampling in various ways. For example, according to embodiments, the LOD configurator may sequentially select points based on the gap of the sampling rate according to the Morton order of the points included in each region corresponding to a node. That is, the LOD configurator 1610 selects a point (0th point) organized first according to the Morton order, and points separated by the sampling rate from the first point (for example, the fifth point from the first point when the sampling rate is 5) as many as the sampling number. According to embodiments, the LOD configurator may select points having a Morton code value closest to the Morton code value of a center point as many as the sampling number based on the Morton code value of the center point of the node and the Morton code values of the neighbor points.

As described with reference to FIG. 9, the point cloud encoder (or attribute information predictor) according to the embodiments generates predictors for points and perform predicting transform coding for setting a predicted attribute (or predicted attribute value) of each point. That is, it may generate N predictors for N points.

When each LOD (or LOD set) is generated, the neighbor point set configurator 1620 may search for or retrieve one or more neighbor points for a point of the LOD1 set. The number of the one or more neighbor points may be expressed as X, where X is an integer greater than 0. According to embodiments, a neighbor point is a nearest neighbor (NN) point located closest to the point of the LOD1 set in a 3D space, and is included in the same LOD as the target LOD (for example, LOD1), or an LOD set of a lower level (e.g., LOD1-1, LOD1-2 . . . , LOD0) than the target LOD. The neighbor point set configurator 1620 may register one or more searched neighbor points as a neighbor point set in the predictor. According to embodiments, the number of neighbor points may be set as the maximum number of neighbor points according to an input signal from a user, or may be preset to a specific value according to a neighbor point search method.

According to embodiments, the neighbor point set configurator 1620 may search LOD0 and LOD1 for a neighbor point for a point P3 belonging to LOD1 shown in FIG. 9. As shown in FIG. 9, LOD0 includes P0, P5, P4 and P2. LOD2 includes points of LOD0, points of LOD1 and P9, P8 and P7. When the number of neighbor points, X, is 3, the neighbor point set configurator 1620 searches points belonging to LOD 0 or LOD1 for three neighbor points closest to P3 in the 3D space shown at the top of FIG. 9. That is, the neighbor point set configurator 1620 may search for P6 belonging to LOD1, the same LOD level, and P2 and P4 belonging to LOD0, which a lower LOD level, as neighbor points of P3. In 3D space, P7 is a point close to P3, but is not searched for as a neighbor point because it is in a higher LOD level. The neighbor point set configurator 1620 may register the searched neighbor points P2, P4, and P6 as a neighbor point set in the predictor of P3. Methods for generating a neighbor point set according to embodiments are not limited to the example. In addition, information on the method for generating a neighbor point set according to the embodiments (hereinafter, neighbor point set generation information) is included in a bitstream containing the encoded point cloud video data, and is transmitted to a reception device (e.g., the reception device 10004 of FIG. 1 or the point cloud decoder of FIGS. 10 and 11).

As described above, all points may have one predictor. The point cloud encoder according to the embodiments may apply a predictor to encode an attribute value of a corresponding point and generate a predicted attribute (or predicted attribute value). According to embodiments, the predictor is generated based on the searched neighbor points after generating LODs. The predictor is used to predict the attribute of the target point. The attribute value of the point and the residual value of the attribute predicted by the predictor of the point are transmitted to the point cloud reception device through a bitstream.

Figure 17:
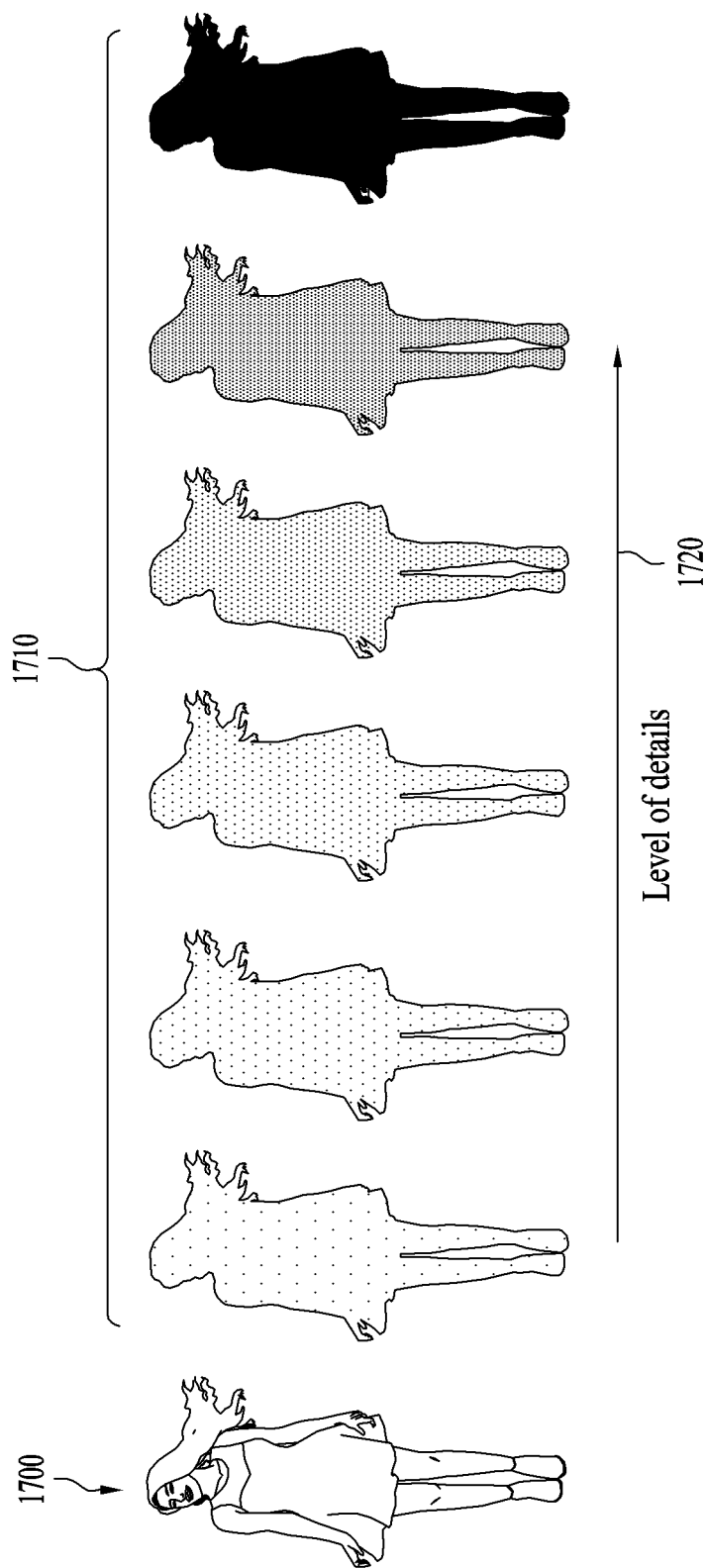
FIG. 17 illustrates distribution of points according to LOD levels.

FIG. 17 illustrates distribution of points according to LOD levels.

The leftmost part 1700 of the figure represents the content corresponding to the LOD of the highest level. Arrow 1710 indicates an increase in the LOD level from the lowest level of the LOD. As the LOD level is lowered, the distance between points is increased (the density is decreased). As the LOD level is raised, the distance between the points is decreased (the density is increased).

Figure 18:
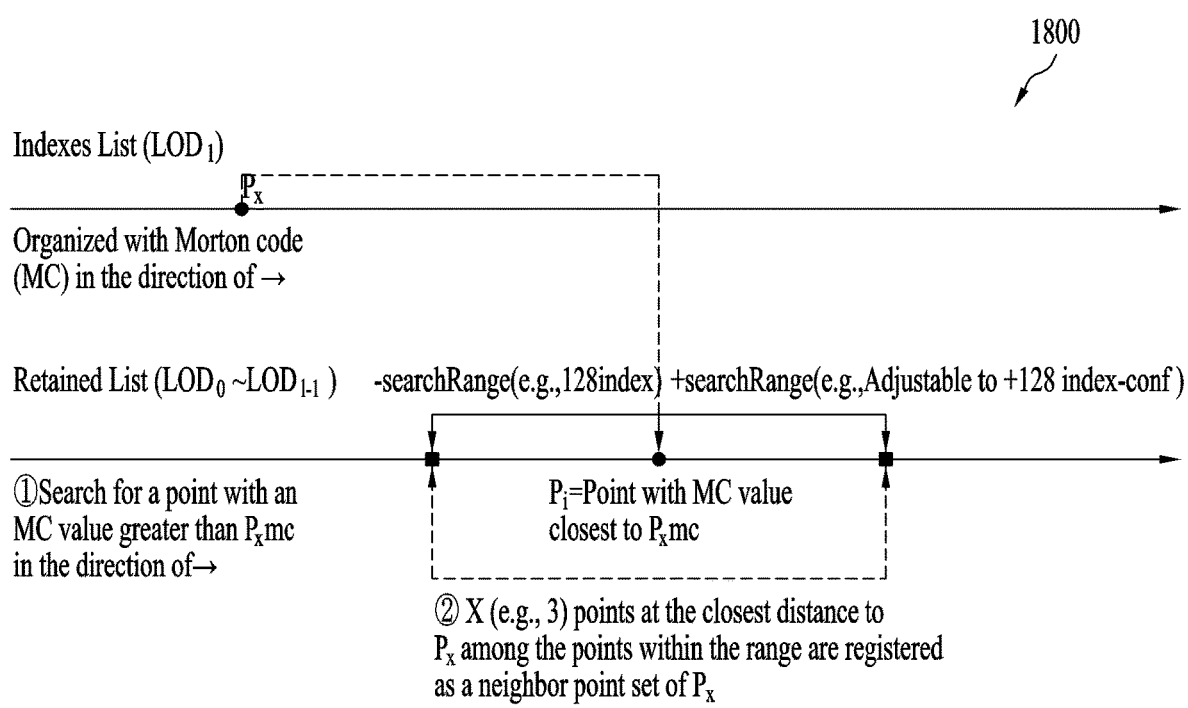
FIG. 18 illustrates an example of a neighbor point set search method.

FIG. 18 illustrates an example of a neighbor point set search method.

FIG. 18 is an example of a method of searching for a neighbor point set by a neighbor point set configurator (e.g., the neighbor point set configurator 1620 of FIG. 16). Arrows shown in the figure indicate a Morton order according to the embodiments.

As described above, the point cloud encoder according to the embodiments may present the position values of points (e.g., coordinate values (x, y, z) of a coordinate system representing 3D space) as bit values, and generate a Morton code by mixing the bits. The points are organized in ascending order based on the size of the Morton code. Therefore, the point positioned before the other points organized in Morton order has the smallest Morton code. In order to generate a neighbor point set for a point Px belonging to the LOD1 set, the neighbor point set configurator according to the embodiments performs the neighbor point set search on points positioned before the point Px in Morton order (that is, points having a Morton code less than or equal to the Morton code of Px) among the points (retained list) belonging to the LOD0 to LOD1-1 sets and the points belonging to the LOD1 set. According to embodiments, when there is one LOD, the neighbor point set configurator may determine a neighbor point search range based on a position of the prediction target point (e.g., Px) in Morton order.

The neighbor point set configurator may search for points having a Morton code closest to the Morton code of the point Px among the points positioned before the point Px in Morton order. According to embodiments, the searched point may be referred to as a center point. The method of searching for the center point is not limited to this example. According to embodiments, the neighbor point configurator may increase a compression rate according to attribute encoding by shifting a search range according to a method of searching for the center point. According to embodiments, information on the method of searching for the center point is included in the neighbor point set generation information, and transmitted to the reception device (e.g., the reception device 10004 of FIG. 1 or the point cloud decoder of FIGS. 10 and 11) through a bitstream containing the above-described encoded point cloud video data. According to embodiments, when there is one LOD, the neighbor point set configurator may determine a neighbor point search range based on a position of the prediction target point (e.g., Px) in Morton order.

The neighbor point set configurator may set a neighbor point search range based on the searched center point. The neighbor point search range may include one or more points positioned before and after the center point in Morton order. According to embodiments, information on the neighbor point search range may be included in the neighbor point set generation information and transmitted to the reception device through a bitstream containing the encoded point cloud video data. The neighbor point set configurator compares the distances between the points within the neighbor point search range determined around the center point and the point Px, and registers the points at the closest distance from the point Px as many as the set maximum number of neighbor points (for example, 3) as neighbor points.

Since the registered neighbor points are close to the target point (e.g., Px), it is determined that they have a high attribute correlation. However, depending on the characteristics of the point cloud content, there may be a case where the distances between the registered neighbor points are not all adjacent to the target point (e.g., Px) in terms of distance.

Figure 19:
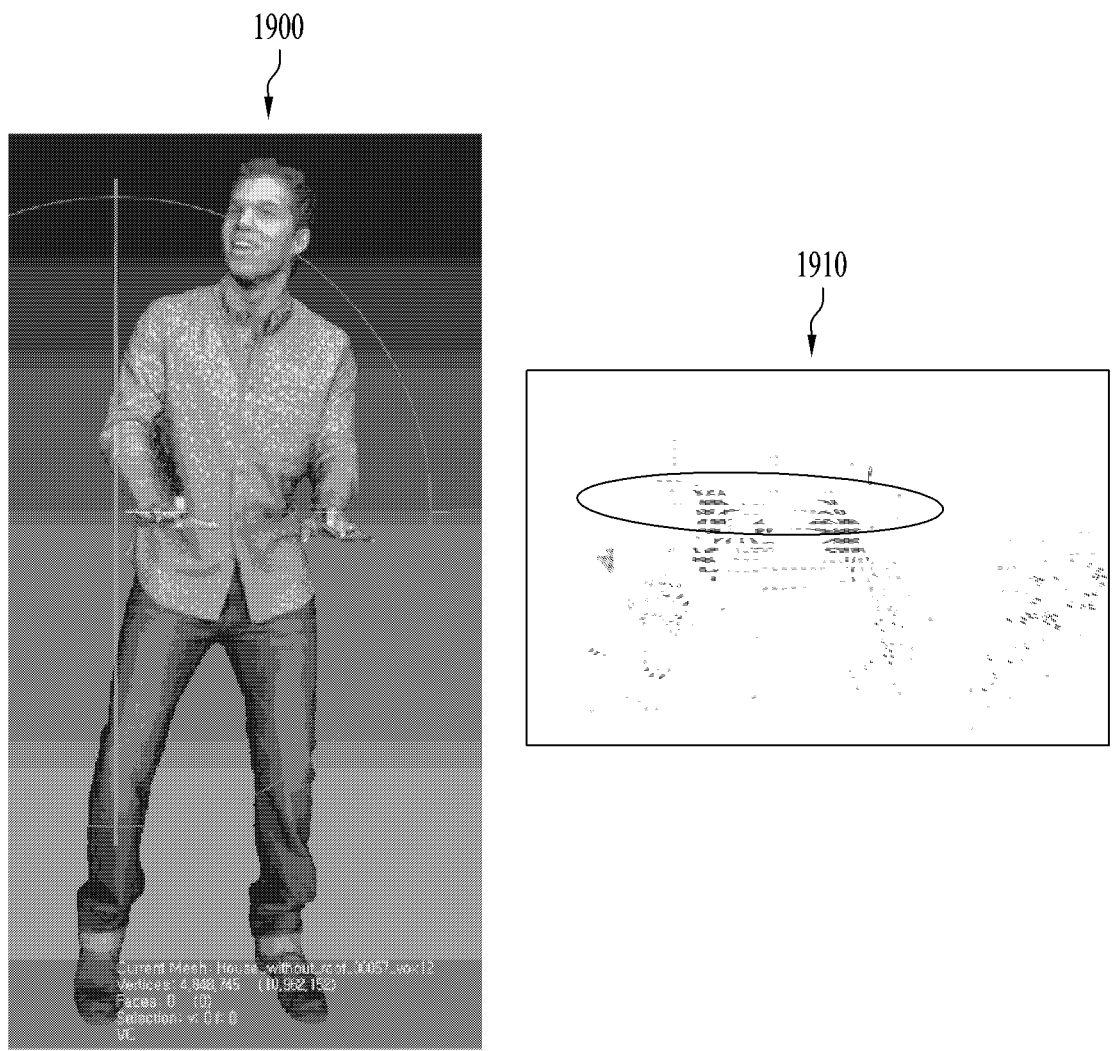
FIG. 19 shows an example of point cloud content.

FIG. 19 shows an example of point cloud content.

The left part of the figure shows point cloud content 1900 having high density of points, and the right part of the figure shows point cloud content 1910 having low density of points. Point cloud content has different characteristics depending on the object, capture method, and employed equipment.

For example, the point cloud content 1900, which has a high density of points, is generated by capturing a relatively narrow area of an object with a 3D scanner or the like, and thus has a high correlation between the points. The point cloud content 1910, which has a low density of points, is generated by capturing a large area at a low density using LiDAR equipment or the like, and thus has a relatively low correlation between the points.

Accordingly, in the case of the point cloud content 1900 having a high density, even when the registered neighbor points are apart from a target point (e.g., point Px), the efficiency of attribute coding is not degraded because the attribute correlation between the points is high. In the case of the point cloud content 1910 having a low density, the efficiency of attribute coding is not degraded only when the distance between the registered neighbor points and the target point is within a range in which attribute correlation between the points is guaranteed.

Accordingly, in order to secure optimal attribute compression efficiency regardless of the characteristics of the point cloud content, the point cloud encoder according to the embodiments executes a neighbor point search method in which the maximum nearest neighbor distance between the neighbor points and the target point in consideration of the characteristics of the point cloud content is set (calculated) to select and register neighbor points. The maximum nearest neighbor distance may vary according to the LOD generation method, or may be set by a user. According to the embodiments, information about the maximum nearest neighbor distance, for example, information about a maximum nearest neighbor distance calculation method, related parameters, and the like is transmitted through a bitstream. Accordingly, the point cloud reception device may secure the information about the maximum nearest neighbor distance from the bitstream, and search for neighbor points based on the secured information to perform attribute decoding.

Figure 20:
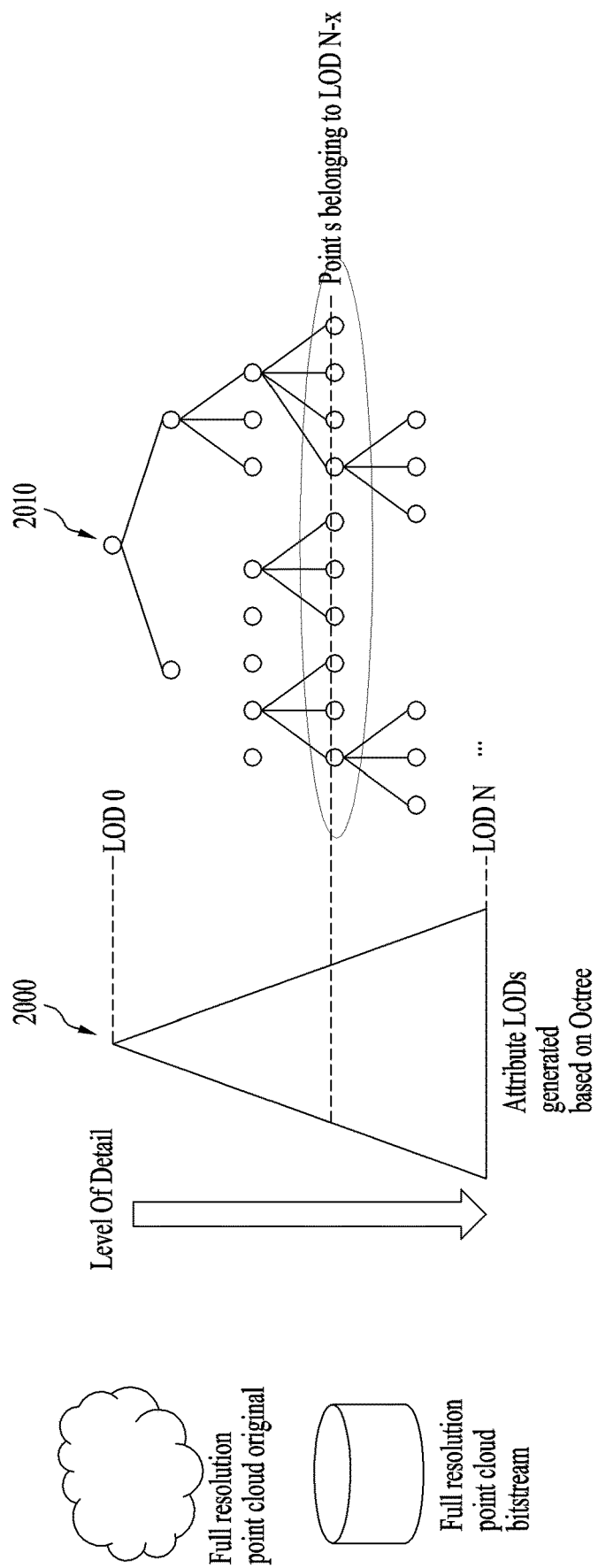
FIG. 20 illustrates an example of an octree-based LOD generation process.

FIG. 20 illustrates an example of an octree-based LOD generation process.

An LOD 2000 according to the embodiments may include points grouped based on a distance between points. The point cloud encoder reorganizes the points based on an octree 2010 to generate one or more LODs. An iterative generation algorithm that is applicable to octree decoding according to the positions of points or the order of the points (e.g., Morton code order, etc.) is applied to the grouped points. In each sequential iteration, one or more refinement levels, R0, R1, ..., Ri belonging to one LOD (e.g., LODi) are generated. That is, the level of LOD is a combination of refinement levels. An octree has one or more depths. As described with reference to FIGS. 5 to 8, in the octree, an upper node is called a root node, and a lower node is called a leaf node, and the depth increases in a direction from the root node to the leaf node. Each depth of the octree may correspond to one or more LOD levels. For example, the root node corresponds to LOD0, and the leaf note corresponds to the maximum level, LOD N. The depth of points S of the octree 2010 shown in the figure corresponds to the level of LOD N-x.

According to embodiments, an LOD is generated using an approximate nearest neighbor search method in the direction from the lowest point to the highest point in the octree. That is, the nearest neighbor points of the corresponding point in the current LOD are searched for in LODs (e.g., LOD1-1) whose levels are lower than or equal to the level of the current LOD (e.g., LOD1). The point cloud processing device (or transmission device) according to the embodiments may calculate a maximum nearest neighbor distance, and select points at a distance shorter than or equal to the maximum nearest neighbor distance from the corresponding point as neighbor points. According to embodiments, the maximum nearest neighbor distance is determined based on a reference distance, which is a diagonal distance of a block corresponding to an upper node of an octree node corresponding to the LOD (e.g., LOD1) to which the point belongs.

According to embodiments, the reference distance for each LOD is expressed as follows.

Reference distance=$\sqrt{2^{LOD^2} \times 3}$ or L2-based reference distance=$2^{LOD^2} \times 3$ Here, the parameter LOD denotes the level of each LOD.

Figure 21:
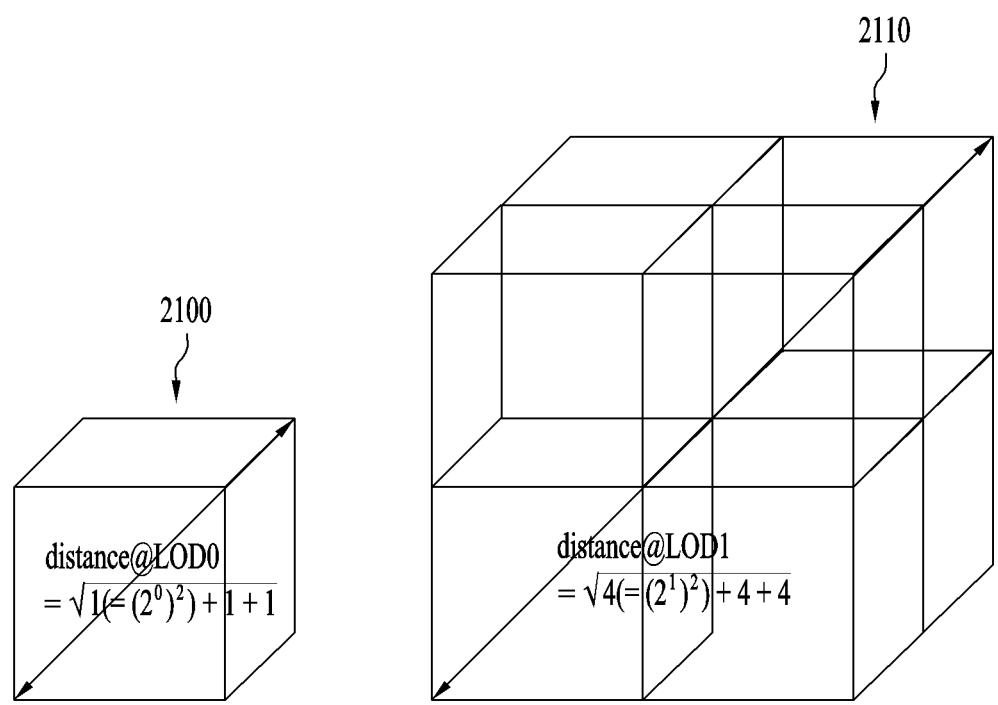
FIG. 21 shows an example of a reference distance.

FIG. 21 shows an example of a reference distance.

As described with reference to FIG. 20, the reference distance for each LOD represents a diagonal distance of a block to which each LOD belongs.

The left part of the figure shows a block 2100 corresponding to LOD0, and the right part of the figure shows a block 2110 corresponding to LOD1. In the octree, a parent node (or upper node) has 8 child nodes. Accordingly, a 3D block corresponding to the parent node may include 83D blocks corresponding to the child node (or lower node). Accordingly, a block 2110 corresponding to LOD1 may include 8 blocks belonging to the same parent node (e.g., the node corresponding to LOD0 shown in FIG. 20).

The reference distance of LOD0 is $\sqrt{3}$ according to the equation described with reference to FIG. 20, and the reference distance of LOD1 is $\sqrt{8}$.

Figure 22:
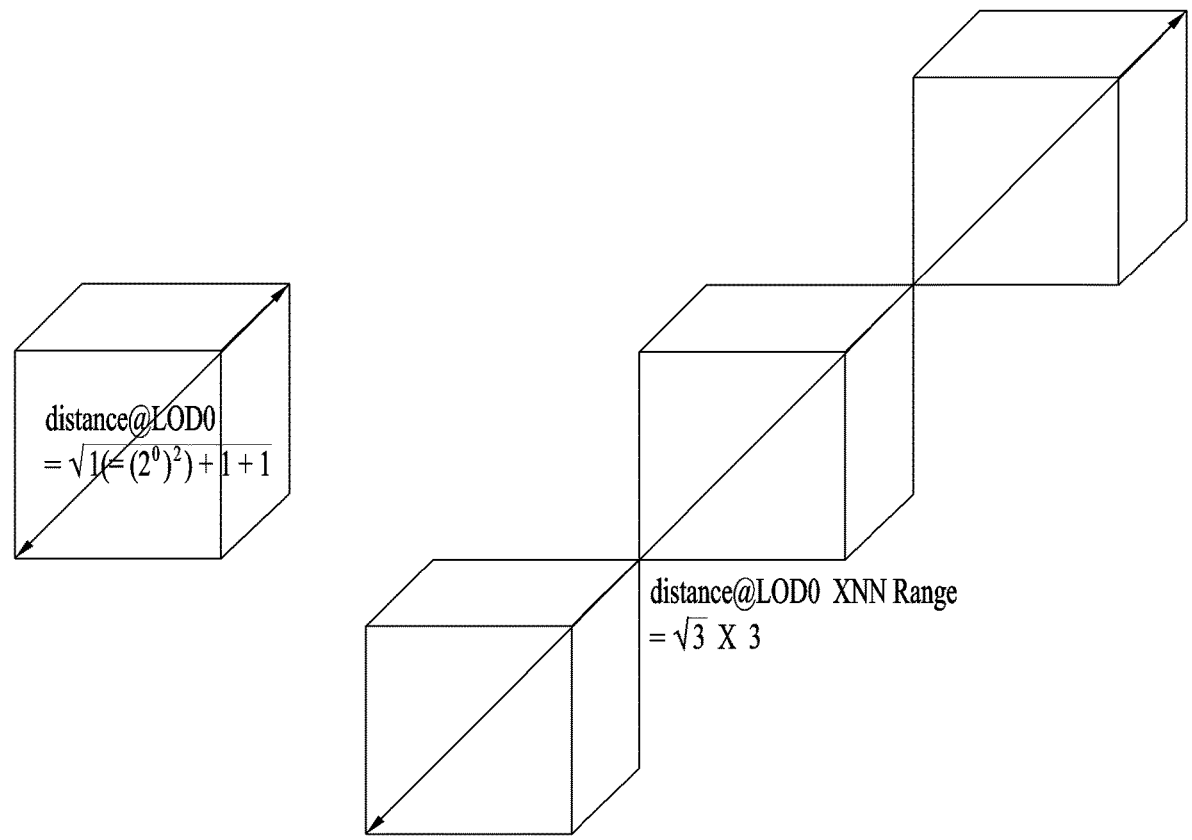
FIG. 22 illustrates an example of the maximum nearest neighbor distance.

FIG. 22 illustrates an example of the maximum nearest neighbor distance.

The point cloud transmission device according to the embodiments may set an octree node range as a neighbor point search range according to the characteristics of the point cloud content. According to embodiments, the neighbor point search range is calculated as the number of neighbor nodes (e.g., parent nodes) of an octree node corresponding to the LOD level to which a corresponding point belongs. The neighbor point search range may be expressed as NN_Range. NN_Range indicates the number of octree nodes around the current point. That is, NN_Range indicates the number of one or more octree nodes (or parent octree nodes) corresponding to the depth of the octree equal to or lower than the depth of the octree corresponding to the LOD level to which the current point belongs. According to embodiments, the neighbor point search range may include a maximum range and a minimum range. According to embodiments, the maximum nearest neighbor distance is determined (calculated) based on the reference distance and the neighbor point search range described with reference to FIG. 20 as follows.

Maximum nearest neighbor distance=$\sqrt{2^{LOD^2} \times 3} \times$ NN_Range,

L2-based maximum nearest neighbor distance=$2^{LOD^2} \times 3 \times$ NN_Range$^2$.

The maximum nearest neighbor distance calculation method according to embodiments may be referred to as octree-based neighbor point maximum nearest neighbor distance calculation.

The left part of FIG. 22 shows an example of the maximum nearest neighbor distance ($\sqrt{3}$) when the value of NN_Range is 1, and the right part of FIG. 22 shows an example of the maximum nearest neighbor distance ($3\sqrt{3}$) when the value of NN_Range is 3. According to embodiments, the value of NN_Range may be set to any value regardless of the octree node range. Thus, the maximum nearest neighbor distance is expressed as L2-based maximum nearest neighbor distance=$2^{LOD^2} \times 3 \times$ NN_Range Here, the LOD is a parameter indicating the level of the LOD to which a prediction target point belongs. According to embodiments, NN_Range may be set by a method of calculating a distance between the target point (e.g., Px) and neighbor points. For example, the distance calculation method may use L2 Norm(L2=$\sqrt{n\Sigma ix2i}$=$\sqrt{x21+x22+x23+\ldots+x2n}$), or may use L1 Norm (L1=$(n\Sigma i|xi|)$=|x1|+|x2|+|x3|+ . . . +|xn|) to reduce the amount of computation, or may use L2$^2$ and L1$^2$. The value of NN_Range is adjusted according to the above-described distance calculation method. In addition, NN_Range may be set according to characteristics of point cloud content. The point cloud transmission device selects, as neighbor points, points (neighbor point candidate points) having a distance equal to or less than the maximum nearest neighbor distance from the current point. In addition, the point cloud transmission device transmits information on NN_Range to the point cloud reception device through a bitstream. Accordingly, the point cloud reception device (or point cloud decoder) secures the information on NN_Range, calculates the maximum nearest neighbor distance, and generates a neighbor point set based on the maximum nearest neighbor distance to perform attribute decoding.

Figure 23:
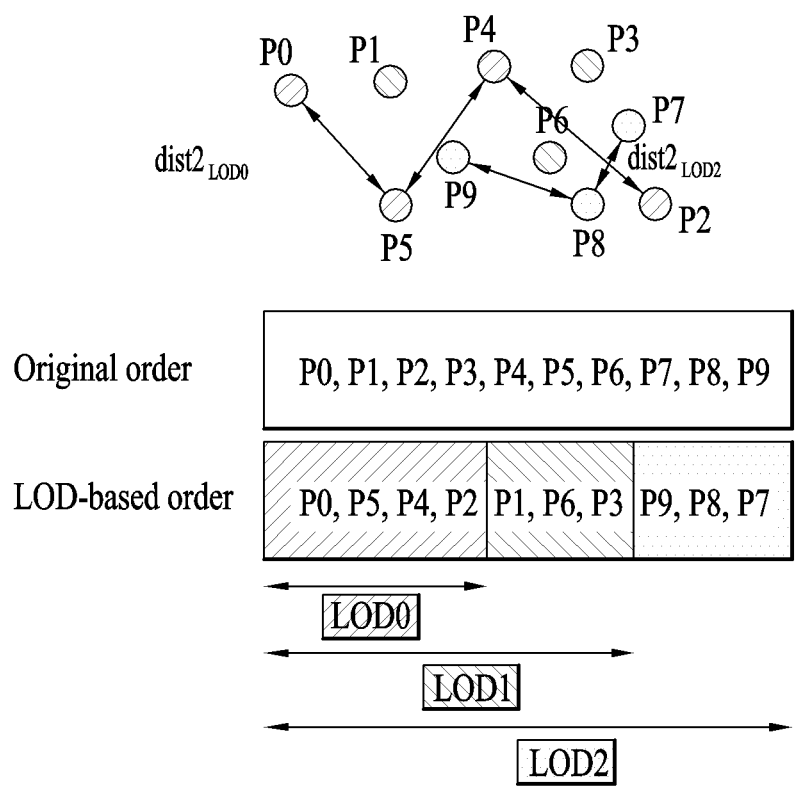
FIG. 23 illustrates an example of the maximum nearest neighbor distance.

FIG. 23 illustrates an example of the maximum nearest neighbor distance.

According to embodiments, the LOD may be generated based on the distance between points. A distance for selecting a point for each LOD may be set or calculated by a user. The distance for selecting a point for each is expressed as follows.

dist2$_L$, where L denotes the level of the LOD.

The distance for selecting a point for each LOD is set as a reference distance for the neighbor point search.

FIG. 23 shows a reference distance for neighbor points belonging to each LOD. The distance between points P0, P2, P4, and P5, which belong to LOD0, is dist2$_{LoD0}$, and the distance between points P7, P8, and P9, which belong to LOD2, is dist$_{LOD2}$. As described above with reference to FIG. 22, the neighbor point search range may be expressed as NN_Range. The maximum nearest neighbor distance according to the embodiments is determined based on the reference distance and the search range as follows.

Maximum nearest neighbor distance=dist2$_L \times$ NN_Range, or

L2-based maximum nearest neighbor distance=dist2$_L^2 \times$ NN_Range$^2$.

The maximum nearest neighbor distance calculation method according to the embodiments may be referred to as a distance-based neighbor point maximum nearest neighbor distance calculation method.

According to embodiments, NN_Range may be set by a method of calculating a distance between a target point (e.g., Px) and neighbor points. For example, the distance calculation method may use L2 Norm(L2=$\sqrt{\Sigma ix2i}$=$\sqrt{x21+x22+x23+\ldots+x2n}$), or may use L1 Norm (L1=$(n\Sigma i|xi|)$=|x1|+|x2|+|x3|+ . . . +|xn|) to reduce the amount of computation, or may use L2$^2$ and L1$^2$.

According to embodiments, the LOD may be generated based on sampling (decimation). That is, the point cloud transmission device may organize the points based on the Morton code value, and then register, in the current LOD, points that do not correspond to the k-th point according to the organization order. Points that are not registered are used to generate other LODs different from the current LOD. The LODs may have the same or different values of k. The value of k for each LOD is expressed as k$_L$. The reference distance for a neighbor point search according to the embodiments is set to an average of the distances between the average and consecutive k$_L$-th points of the respective LOD. The average may be calculated for all or some of the k$_L$-th points. The reference distance according to the embodiments is given as follows.

Reference distance=average_dist2norm(MC_points[(i+1)*k$_L$]−MC_points[i*k$_L$]), where MC_points denotes the points organized based on the Morton code.

As described above with reference to FIG. 22, the neighbor point search range is expressed as NN_Range. The maximum nearest neighbor distance according to the embodiments is determined based on the above-described reference distance and search range, and is given as follows.

Maximum nearest neighbor distance=average_dist2norm (MC_points[(i+1)*k$_L$]-MC_points[i*k$_L$])×NN_Range, or L2-based maximum nearest neighbor distance=average_distnorm(MC_points[(i+1)*k$_L$]−MC_points[i*k$_L$])×NN_Range$^2$.

Here, average_dist2norm and average_distnorm represent an operation of calculating the average of distances using the position difference vectors of points as input values. The maximum nearest neighbor distance calculation method according to the embodiments may be referred to as sampling-based neighbor point maximum nearest neighbor distance calculation.

NN_Range according to embodiments may be set by a method of calculating a distance between a target point (e.g., Px) and neighbor points. For example, the distance calculation method may use L2 Norm(L2=$\sqrt{n\Sigma ix2i}$=$\sqrt{x21+x22+x23+\ldots+x2n}$), or may use L1 Norm (L1=$(n\Sigma i|xi|)$=|x1|+|x2|+|x3|+ . . . +|xn|) to reduce the amount of computation, or may use L2$^2$ and L1$^2$.

The reference distance for the neighbor point search according to the embodiments may be calculated as an average difference in Morton code between the sampled points (a method of calculating the maximum nearest neighbor distance of neighbor points through the calculation of the average difference between the Morton codes for each LOD), or may be calculated as an average distance between points calculated for the currently configured LODs regardless of distance and sampling (a method of calculating the maximum nearest neighbor distance of neighbor points through the calculation of the average distance difference for each LOD). The maximum nearest neighbor distance may be set according to a user input, and may be transmitted to the point cloud reception device through a bitstream.

Figure 24:
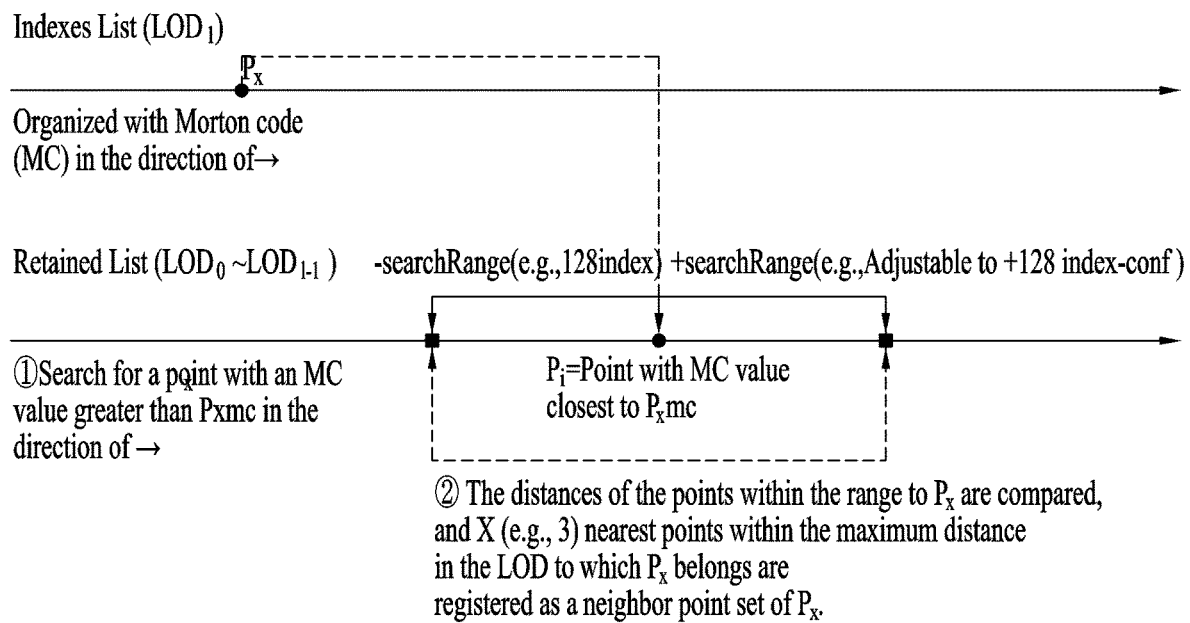
FIG. 24 illustrates an example of a neighbor point set search.

FIG. 24 illustrates an example of a neighbor point set search.

FIG. 24, is similar to FIG. 18, illustrates a process in which a neighbor point set configurator (for example, the neighbor point set configurator 1610 of FIG. 16) performs a neighbor point set search based on the maximum nearest neighbor distance described with reference to FIGS. 20 to 23. Arrows shown in the figure indicate a Morton order according to the embodiments. In order to generate a neighbor point set for a point Px belonging to the $LOD_l$ set, the neighbor point set configurator according to the embodiments performs the neighbor point set search on points positioned before the point Px in Morton order (that is, points having a Morton code less than or equal to the Morton code of Px) among the points (retained list) belonging to the $LOD_0$ to $LOD_{l-1}$ sets and the points belonging to the $LOD_l$ set. The neighbor point set configurator may search for points having a Morton code closest to the Morton code of the point Px among the points positioned before the point Px in Morton order. According to embodiments, the searched point may be referred to as a center point. The neighbor point set configurator compares the distances between the point Px and the points within the neighbor point search range to the left and right of the searched center point. The neighbor point set configurator registers, as a neighbor point set, points closest to Px among the points within the maximum nearest neighbor distance determined at the LOD to which Px belongs (for example, the maximum nearest neighbor distance described with reference to FIGS. 20 to 23).

According to embodiments, in searching for neighbor points among the points within the search range, the neighbor point set configurator divides the search range into one or more blocks to reduce the search time. A method of searching for neighbor points for a group of points corresponding to a block is configured as follows.

The points in the retained list are divided into K groups. The point cloud transmission device calculates a position and a size of a bounding box surrounding the points in each group.

The point cloud transmission device searches for points having a Morton code value closest to the Morton code of the point Px among the points in the retained list. The searched points are represented by Pi.

The distances between Px and the points in the group to which the searched point Pi belongs may be calculated, and points at a close distance may be registered as neighbor points.

When the number of the registered neighbor points is smaller than the maximum number of neighbor points, the distance between the corresponding point and the points in an adjacent group may be calculated.

When the number of the registered neighbor points is larger than the maximum number of neighbor points, the distance between the bounding box of the next adjacent group and Px is calculated. The calculated distance is compared with the longest distance among the distances between the registered neighbor points and Px. When the calculated distance is greater than the longest distance, the points in the group are not used as neighbor point candidates. When the calculated distance is less than the longest distance, the distances between the points in the group and Px may be calculated, and a point having a close distance may be registered as a neighbor point (neighbor point update). The neighbor point search according to the embodiments is performed only within the search range (e.g., 128).

Since the neighbor point set configurator searches for neighbor points around Pi as described above, time for searching for neighbor points may be saved. In addition, when neighbor points are searched for as many as the maximum number of neighbor points, the neighbor point registration procedure may be omitted. In addition, since the neighbor point set configurator searches for neighbor points based on the bounding box, accuracy in neighbor point search may be enhanced.

As described above, the maximum nearest neighbor distance may be applied in calculating the distances between points or after searching for all neighbor points. The result of generation of the neighbor point set may vary depending on the step in which the maximum nearest neighbor distance is applied, and may affect the bitstream size and PSNR.

Therefore, the point cloud transmission device (or neighbor point set generator) according to the embodiments may calculate the distances between Px and the points according to the characteristics of the point cloud content and/or service, and register points having a distance less than or equal to the maximum nearest neighbor distance as neighbor points. In addition, the point cloud transmission device may register the maximum neighbor points of Px according to the characteristics of the point cloud content and/or service, determine whether the distances between the registered points and the point Px are shorter than or longer than the maximum nearest neighbor distance, that is, whether the distances are within the maximum nearest neighbor distance, and remove points that are not within the maximum nearest neighbor distance from the neighbor points. The maximum nearest neighbor distance application step (or position) according to the embodiments is included in the information about the maximum nearest neighbor distance described with reference to FIG. 19, for example, the information about the maximum nearest neighbor distance calculation method, related parameters, and the like, and is transmitted through a bitstream. Accordingly, the point cloud reception device may obtain the information about the maximum nearest neighbor distance from the bitstream, search for neighbor points based on the obtained information, and perform attribute decoding.

Figure 25:
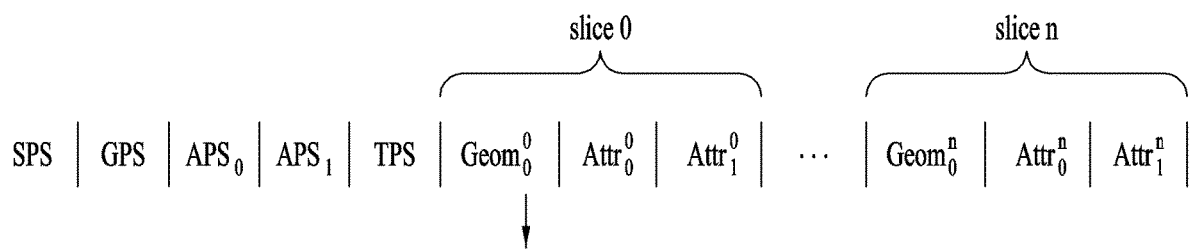
FIG. 25 shows an example of a bitstream structure diagram.

FIG. 25 shows an example of a bitstream structure diagram.

The point cloud processing device (e.g., the transmission device described with reference to FIGS. 1, 12, and 14) may transmit the encoded point cloud data in the form of a bitstream. The bitstream is a sequence of bits that form a representation of point cloud data (or a point cloud frame).

The point cloud data (or point cloud frame) may be partitioned into tiles and slices.

The point cloud data may be partitioned into multiple slices, and is encoded in a bitstream. One slice is a set of points and is expressed as a series of syntax elements representing all or part of the encoded point cloud data. One slice may or may not have dependencies on other slices. In addition, one slice may include one geometry data unit, and may have one or more attribute data units or zero attribute data unit. Since attribute encoding is performed based on geometry encoding as described above, the attribute data unit is based on geometry data unit in the same slice. That is, the point cloud data reception device (e.g., the reception device 10004 or the point cloud video decoder 10006) may process the attribute data based on the decoded geometry data. Accordingly, the geometry data unit must appear before the associated attribute data units within the slice. The data units in the slice are necessarily consecutive, and the order of slices is not specified.

A tile is a (3D) rectangular parallelepiped in a bounding box (for example, the bounding box described with reference to FIG. 5). The bounding box may include one or more tiles. One tile may fully or partially overlap another tile. One tile may include one or more slices.

Accordingly, the point cloud data transmission device may provide high-quality point cloud content by processing data corresponding to the tile according to the importance. That is, the point cloud data transmission device according to the embodiments may process data corresponding to an area important to a user using point cloud compression coding with better compression efficiency and appropriate latency.

According to embodiments, a bitstream contains signaling information and a plurality of slices (slice 0, . . . , slice n). As shown in the figure, the signaling information precedes the slices in the bitstream. Accordingly, the point cloud data reception device may first obtain the signaling information and sequentially or selectively process a plurality of slices based on the signaling information. As shown in the figure, slice 0 includes one geometry data unit(Geom$0^0$) and two attribute data units (Attr$0^0$ and Attr$1^0$). Also, the geometry data unit precedes the attribute data units in the same slice. Accordingly, the point cloud data reception device first processes (decodes) a geometry data unit (or geometry data), and processes attribute data units (or attribute data) based on the processed geometry data. The signaling information according to the embodiments may be referred to as signaling data, metadata, or the like, but is not limited thereto.

According to embodiments, the signaling information includes a sequence parameter set (SPS), a geometry parameter set (GPS), and one or more attribute parameter sets (APSs). The SPS is encoding information about the entire sequence, such as a profile or a level, and may include comprehensive information (sequence level) about the entire sequence, such as a picture resolution and a video format. The GPS is information about geometry encoding applied to geometry included in the sequence (bitstream). The GPS may include information about an octree (e.g., the octree described with reference to FIG. 6) and information about an octree depth. The APS is information about attribute encoding applied to an attribute included in the sequence (bitstream). As shown in the figure, the bitstream contains one or more APSs (e.g., APS0, APS1 . . . in the figure) according to an identifier for identifying an attribute.

According to embodiments, the signaling information may further include a TPS. The TPS is information about a tile, and may include information about a tile identifier, a tile size, and the like. According to embodiments, the signaling information is applied to a corresponding bitstream as information about a sequence, that is, a bitstream level. In addition, the signaling information has a syntax structure including a syntax element and a descriptor describing the same. A pseudo code for describing the syntax may be used. In addition, the point cloud reception device may sequentially parse and process syntax elements appearing in the syntax.

Although not shown in the figure, the geometry data unit and the attribute data unit include a geometry header and an attribute header, respectively. The geometry header and the attribute header are signaling information applied at a corresponding slice level and have the above-described syntax structure.

The geometry header includes information (or signaling information) for processing a corresponding geometry data unit. Therefore, the geometry header appears first in the geometry data unit. The point cloud reception device may process the geometry data unit by first parsing the geometry header. The geometry header has an association with the GPS, which contains information about the entire geometry. Accordingly, the geometry header contains information specifying gps_geomparameter_set_id included in the GPS. In addition, the geometry header contains tile information (e.g., tile_id) related to a slice to which the geometry data unit belongs, and a slice identifier.

The attribute header contains information (or signaling information) for processing a corresponding attribute data unit. Accordingly, the attribute header appears first in the attribute data unit. The point cloud reception device may process the attribute data unit by first parsing the attribute header. The attribute header has an association with the APS, which contains information about all attributes. Accordingly, the attribute header contains information specifying aps_attr_parameter_set_id included in the APS. As described above, attribute decoding is based on geometry decoding. Accordingly, the attribute header contains information specifying a slice identifier contained in the geometry header in order to determine a geometry data unit associated with the attribute data unit.

When the point cloud data transmission device generates a set of neighbor points by applying the maximum nearest neighbor distance described in FIGS. 20 to 24 and performs attribute encoding, the signaling information in the bitstream may include information related to the maximum nearest neighbor distance. According to embodiments, the information related to the maximum nearest neighbor distance may be included in signaling information (e.g., SPS, APS, etc.) of the sequence level, or may be included in the slice level (e.g., attribute header).

FIG. 26 is an example of signaling information according to embodiments.

FIG. 26 represents a syntax structure of the SPS described with reference to FIG. 25, and shows an example in which the information related to the maximum nearest neighbor distance described with reference to FIG. 25 is contained in the SPS of the sequence level.

The syntax of the SPS according to the embodiments includes the following syntax elements.

profile_idc indicates a profile applied to the bitstream. The profile specifies constraints imposed on a bitstream to specify capabilities for decoding the bitstream. Each profile is supported by all decoders conforming to the profile as a subset of algorithmic features and constraints. It is intended for decoding and may be defined according to standards.

profile_compatibility_flags indicates whether the bitstream conforms to a specific profile for decoding or another profile.

sps_num_attribute_sets indicates the number of coded attributes in the bitstream. The value of sps_num_attribute_sets shall be in the range of 0 to 63.

The for statement following sps_num_attribute_sets includes elements indicating information about each of the attributes as many as the number indicated by sps_num_attribute_sets. In the figure, i denotes each attribute (or attribute set), and the value of i is greater than or equal to 0 and less than the number indicated by sps_num_attribute_sets.

attribute_dimension_minus1 [i] plus 1 specifies the number of components of the i-th attribute. When the attribute is a color, the attribute corresponds to a three-dimensional signal representing characteristics of light of a target point. For example, the attribute may be signaled as three components of RGB (Red, Green, Blue). The attribute may be signaled as three components of YUV, which are luma (luminance) and two chromas (saturation). When the attribute is reflectance, the attribute corresponds to a one-dimensional signal representing the ratio of the intensity of light reflectance of the target point.

attribute_instance_id[i] specifies the instance id for the i-th attribute. The value of the attribute_instance_id may be used to differentiate attributes with identical attribute labels. For example, it is useful for the point cloud having multiple color from the different view point.

As described above, the SPS syntax contains information about the maximum nearest neighbor distance. The following elements represent the information about the maximum nearest neighbor distance described with reference to FIGS. 20 to 24.

nn_base_distance_calculation_method_type indicates the type of the reference distance calculation method applied in the attribute encoding of the bitstream (sequence). A method of calculating the maximum nearest neighbor distance is specified according to the value of nn_base_distance_calculation_method_type as follows:

0: Using the input reference (maximum) distance;

1: Octree-based neighbor point maximum nearest neighbor distance calculation;

2: Distance-based neighbor point maximum nearest neighbor distance calculation;

3: Sampling-based neighbor point maximum nearest neighbor distance calculation;

4: Neighbor point maximum nearest neighbor distance calculation through calculation of the average difference of Morton codes for each LOD; and 5: Neighbor point maximum nearest neighbor distance calculation through calculation of the average distance difference for each LOD.

When the value of nn_base_distance_calculation_method_type is 0, the SPS syntax includes the following elements.

nn_base_distance indicates a reference distance value used in calculating the maximum nearest neighbor distance.

nearest_neighbour_max_range[i] indicates the maximum range of neighbor points (for example, the maximum range of the neighbor point search range NN_range described with reference to FIG. 22) in encoding the attributes of the bitstream.

nearest_neighbour_min_range[i] indicates the minimum range of neighbor points (for example, the minimum range of the neighbor point search range NN_range described with reference to FIG. 22) in encoding the attributes of the bitstream.

nn_range_filtering_location type indicates a method of applying the neighbor point maximum nearest neighbor distance applied in encoding the attributes of the bitstream. The methods are specified according to the value of nn_range_filtering_location type follows:

0: Calculating the distances between points and applying the neighbor point maximum nearest neighbor distance in registering neighbor points; and 1: Registering all neighbor points and removing only points beyond the neighbor point maximum neighboring distance among the registered points FIG. 27 shows an example of signaling information according to embodiments.

FIG. 27 represents a syntax structure of the APS described with reference to FIG. 25, and shows an example in which the information related to the maximum nearest neighbor distance described with reference to FIG. 25 is included in the APS of the sequence level.

According to embodiments, the syntax of the APS includes the following syntax elements.

aps_attr_parameter_set_id provides an identifier for the APS for reference by other syntax elements. The value of aps_attr_parameter_set_id shall be in the range of 0 to 15, inclusive. One or more attribute data units are contained in the bitstream (e.g., the bitstream described with reference to FIG. 17), and each of the attribute data units includes an attribute header. The attribute header includes a field (e.g., ash_attr_parameter_set_id) having the same value as aps_attr_parameter_set_id. The point cloud reception device according to the embodiments parses the APS and processes the attribute data units referring to the same aps_attr_parameter_set_id, based on the parsed APS and the attribute header.

aps_seq_parameter_set_id specifies the value of sps_seq_parameter_set_id for the active SPS. The value of aps_seq_parameter_set_id shall be in the range of 0 to 15, inclusive.

attr_coding_type indicates the coding type for the attribute for the given value of attr_coding_type. Attribute coding means attribute encoding. As described above, attribute coding uses at least one of RAHT coding, predicting transform coding, and lifting transform coding, and attr_coding_type indicates any one of the aforementioned three coding types. Accordingly, the value of attr_coding_type is equal to any one of 0, 1, or 2 in the bitstream. Other values of attr_coding_type may be used later by ISO/IEC. Accordingly, the point cloud reception device according to the embodiments ignores attr_coding_type having values different from 0, 1, and 2. When attr_coding_type is equal to 0, the attribute coding type is predicting transform coding. When attr_coding_type is equal to 1, the attribute coding type is RAHT coding. When attr_coding_type is equal to 2, the attribute coding type is lifting transform coding. The value of attr_coding_type and the coding type indicated by the value may be changed. For example, when the value is 0, the attribute coding type may be RAHT coding.

The following are syntax elements included in the APS when the attribute coding is lifting transform coding or predicting transform coding.

When the attribute coding is lifting transform coding, the APS includes syntax elements related to the maximum nearest neighbor distance described above.

different_nn_range_in_tile_flag indicates whether to use different maximum/minimum ranges of neighbor points for each tile.

different_nn_range_per_lod_flag indicates whether to use different maximum/minimum ranges of neighbor points for each LOD.

When different_nn_range_per_lod_flag indicates that the maximum/minimum range of neighbor points is not used differently for each LOD, the ASP may include at least one or more of the following syntax elements, nearest_neighbour_max_range, nearest_neighbour_min_range, nn_base_distance_calculation_method_type, nn_base_distance, and nn_range_filtering_type. The description of each element is the same as that of FIG. 26 and is thus skipped.

When different_nn_range_per_lod_flag indicates that different maximum/minimum ranges of neighbor points are for the respective LODs, the APS according to the embodiments includes information for each LOD. The following for statement includes elements indicating information about each of LODs as many as the number indicated num_detail_levels_minus1. The idx shown in the figure denotes each LOD, and the value of idx is greater than or equal to 0 and less than or equal to the number indicated by num_detail_levels_minus1.

The ASP according to the embodiments includes at least one or more of the nearest_neighbour_max_range[idx], nearest_neighbour_min_range[idx], nn_base_distance_calculation_method_type[idx], nn_base_distance[idx], and nn_range_filtering_location type[idx] elements for each LOD. The description of each element is the same as that of FIG. 26 and is thus skipped.

FIG. 28 shows an example of signaling information according to embodiments.

FIG. 28 represents a syntax structure of the TPS described with reference to FIG. 25, and shows an example in which the information related to the maximum nearest neighbor distance described with reference to FIG. 25 is included in the TPS of the sequence level.

The syntax of the TPS according to the embodiments includes the following syntax elements.

num_tiles indicates the number of tiles signaled for the bitstream. When there are no tiles signaled for the bitstream, the value of this information is inferred to be 0. The for statement following num_tiles has signaling parameters for each tile. In the statement, i is a parameter representing each tile, and has a value greater than or equal to 0 and less than the value indicated by num_tiles.

tile_bounding_box_offset_x[i] indicates the x offset of the i-th tile in the Cartesian coordinate system. When this parameter is not present, the value of tile_bounding_box_offset_x[0] is regarded as the value of sps_bounding_box_offset_x included in the SPS.

tile_bounding_box_offset_y[i] indicates the y offset of the i-th tile in the Cartesian coordinate system. When this parameter is not present, the value of tile_bounding_box_offset_y[0] is regarded as the value of sps_bounding_box_offset_y included in the SPS.

When different_nn_range_in_tile_flag in the ASP described with reference to FIG. 27 indicates that a different maximum/minimum range of neighbor points is used for each tile (different_nn_range_in_tile_flag==true), the TPS syntax according to the embodiments includes at least one or more of nearest_neighbour_max_range[i], nearest_neighbour_min_range[i], nn_base_distance_calculation_method_type[i], nn_base_distance[i], and nn_range_filtering_location type[i] elements. The description of each element is the same as that of FIG. 26 and is thus skipped.

The TPS according to the embodiment further includes the following elements.

different_nn_range_in_slice_flag[i] indicates whether different neighbor point maximum/minimum ranges are used for the slices in tile i.

When different neighbor point maximum/minimum ranges are used for the slices in tile i (different_nn_range_in_slice_flag[i]==True), the TPS syntax includes the following element.

nearest_neighbor_offset_range_in_slice_flag[i] indicates whether the maximum/minimum range of neighbor points defined in a slice is indicated by a range offset in the maximum/minimum range of neighbor points defined in the tile or by an absolute value.

FIG. 29 shows an example of signaling information according to embodiments.

FIG. 29 represents a syntax structure of the attribute header described with reference to FIG. 25, and shows an example in which the information about the maximum nearest neighbor distance described with reference to FIG. 25 is included in the attribute header of a slice level. While the figure shows two syntaxes separately for simplicity, the two syntaxes constitute one attribute header syntax.

The syntax of the attribute header according to the embodiments includes the following syntax elements.

ash_attr_parameter_set_id has the same value as aps_attr_parameter_set_id of active SPSs.

ash_attr_sps_attr_idx specifies the order of attribute sets in an active SPS. The value of ash_attr_sps_attr_idx falls within the range from 0 to the value of sps_num_attribute_sets included in the active SPS.

ash_attr_geom_slice_id indicates the value of a slice ID (e.g., gsh_slice_id) included in the geometry header.

When different neighbor point maximum/minimum ranges are used for slices (different_nn_range_in_slice_flag==True in the TPS described with reference to FIG. 28), the attribute header syntax includes the following elements.

different_nn_range_per_lod_flag indicates whether to use different maximum/minimum ranges of neighbor points for respective LODs.

When different maximum/minimum ranges of neighbor points are not used for the respective LODs, the attribute header syntax includes the following elements.

When nearest_neighbour_offset_range_in_slice_flag (e.g., nearest_neighbour_offset_range_in_slice_flag included in the TPS described with reference to FIG. 28) indicates that the maximum/minimum range of neighbor points defined in a slice is indicated by an absolute value, the attribute header syntax includes nearest_neighbour_absolute_max_range and nearest_neighbour_absolute_min_range as elements.

nearest_neighbour_absolute_max_range indicates the maximum range of neighbor points.

nearest_neighbour_absolute_min_range indicates the minimum range of neighbor points. The attribute header syntax includes at least one or more of nn_base_distance_calculation_method_type, nn_base_distance, or nn_range_filtering_location type. The description of each element is the same as that of FIG. 26 and is thus skipped.

When nearest_neighbour_offset_range_in_slice_flag (for example, nearest_neighbor_offset_range_in_slice_flag included in the TPS described with reference to FIG. 28) indicates that the maximum/minimum range of neighbor points defined in a slice is indicated by a range offset in the maximum/minimum range of neighbor points defined in the tile, the attribute header syntax includes nearest_neighbour_max_range_offset and nearest_neighbour_min_range_offset elements.

nearest_neighbour_max_range_offset indicates the maximum range offset of neighbor points of the slice. The reference is the maximum range of neighbor points of a tile to which the slice belongs.

nearest_neighbour_min_range_offset indicates the minimum range offset of neighbor points of the slice. The reference is the minimum range of neighbor points of a tile to which the slice belongs.

The attribute header syntax includes at least one or more of nn_base_distance_calculation_method_type, nn_base_distance, and nn_range_filtering_location_type elements. The description of each element is the same as that of FIG. 26 and is thus skipped.

When different maximum/minimum ranges of neighbor points are used for respective LODs, the attribute header syntax further includes information about the maximum nearest neighbor distance for each LOD.

When nearest_neighbour_offset_range_in_slice_flag (for example, nearest_neighbour_offset_range_in_slice_flag included in the TPS described with reference to FIG. 28) indicates that the maximum/minimum range of neighbor points defined in the slice is indicated by an absolute value, the attribute header syntax includes the following elements. The following for statement has signaling parameters for each LOD. idx is a parameter representing each LOD, and has a value greater than or equal to 0 and less than the value indicated by num_detail_level_munus1. The attribute header syntax includes at least one or more of the nearest_neighbour_absolute_max_range[idx], nearest_neighbour_absolute_min_range[idx], nn_base_distance_calculation_method_type[idx], nn_base_distance[idx], and nn_range_filtering_location type[idx] elements for each LOD. The description of each element is the same as described above, and is thus skipped.

When nearest_neighbour_offset_range_in_slice_flag (e.g., nearest_neighbor_offset_range_in_slice_flag included in the TPS described with reference to FIG. 28) indicates that the maximum/minimum range of neighbor points defined in the slice is indicated by a range offset in the maximum/minimum range of neighbor points defined in the tile, the attribute header syntax includes the following elements. The following for statement has signaling parameters for each LOD. idx is a parameter representing each LOD, and has a value greater than or equal to 0 and less than the value indicated by num_detail_level_munus1. The attribute header syntax includes at least one or more of nearest_neighbour_max_range_offset[idx], nearest_neighbour_min_range_offset[idx], nn_base_distance_calculation_method_type[idx], nn_base_distance[idx], and nn_range_filtering_location type[idx] elements for each LOD. The elements are the same as those described above, and thus description thereof is skipped.

Figure 30:
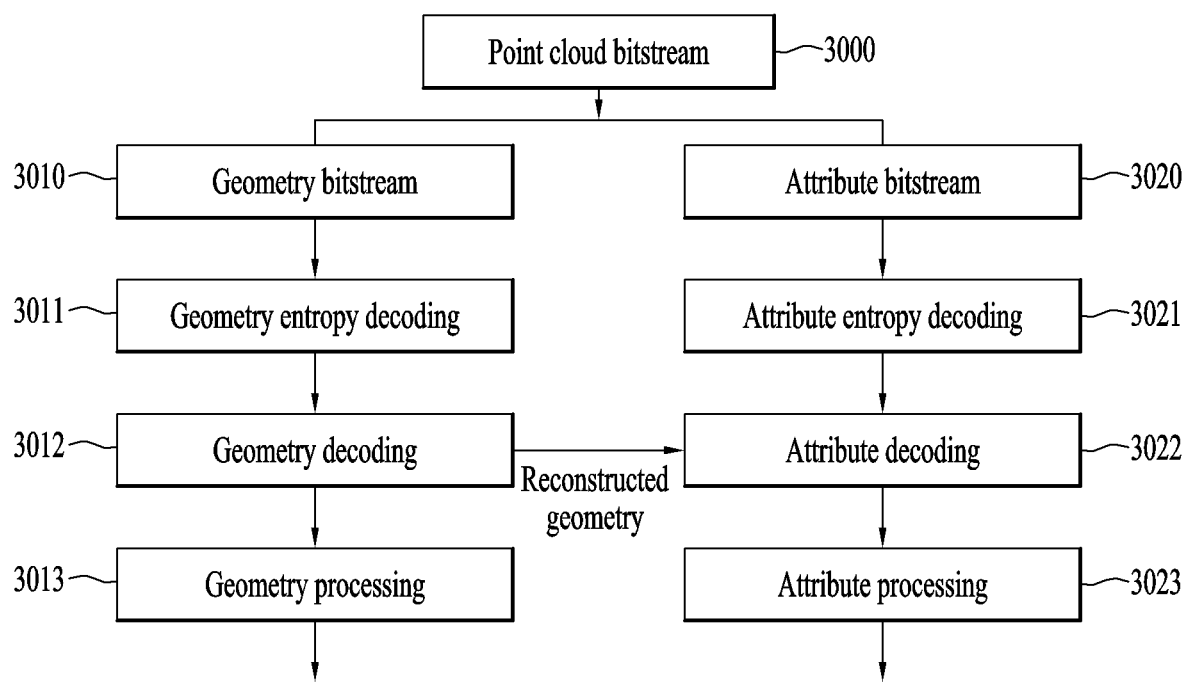
FIG. 30 is a flowchart illustrating an operation of a point cloud reception device according to embodiments.

FIG. 30 is a flowchart illustrating an operation of a point cloud reception device according to embodiments.

The operation of the point cloud reception device of FIG. 30 corresponds to the operation of the point cloud transmission device described with reference to FIG. 15.

The point cloud reception device according to the embodiments (for example, the reception device 10004 of FIG. 1, the point cloud decoder of FIGS. 10 and 11, and the reception device of FIG. 13) receives a point cloud bitstream (for example, the bitstream described with reference to FIG. 25) (3000). As described with reference to FIG. 25, the bitstream contains signaling information, encoded geometry, and encoded attributes.

The point cloud reception device obtains a geometry bitstream and an attribute bitstream from the received bitstream (3010, 3020). The point cloud reception device obtains the geometry bitstream (or geometry data unit) and the attribute bitstream (attribute data unit) based on the signaling information in the bitstream.

The point cloud reception device performs entropy decoding on the obtained geometry bitstream (3011). The point cloud reception device may perform an entropy decoding operation, which is a reverse process of the entropy coding 1522 described with reference to FIG. 15. As described above, the entropy encoding operation may include exponential Golomb, context-adaptive variable length coding (CAVLC), and context-adaptive binary arithmetic coding (CABAC), and the entropy decoding operation may include exponential Golomb, CAVLC, and CABAC according to the entropy encoding operation.

The point cloud reception device performs geometry decoding on the entropy-decoded geometry (3012). According to embodiments, the geometry decoding may include octree geometry decoding and trisoup geometry decoding, but is not limited thereto. The point cloud reception device performs at least one of the operations of the arithmetic decoder (Arithmetic decode) 12000, the octree synthesizer (Synthesize octree) 12001, the surface approximation synthesizer (Synthesize surface approximation) 12002, the geometry reconstructor (Reconstruct geometry) 12003, and the coordinate inverse transformer (Inverse transform coordinates) 12004 described with reference to FIG. 12. In addition, the point cloud reception device performs at least one of the operations of the arithmetic decoder 13002, the occupancy code-based octree reconstruction processor 13003, the surface model processor (triangular reconstruction, up-sampling, voxelization) 13004 and the inverse quantization processor 13005 described with reference to FIG. 13. The point cloud reception device outputs reconstructed geometry information as a result of the geometry decoding. The reconstructed geometry information is used for attribute decoding.

The point cloud reception device processes the geometry-decoded geometry (3013). For example, as described with reference to FIG. 15, when the point cloud transmission device performs coordinate transform on the geometry, the point cloud reception device inversely transforms the coordinates of the geometry to output the geometry.

The point cloud reception device according to the embodiments performs entropy decoding on the obtained attribute bitstream (3021).

The point cloud reception device performs attribute decoding on the entropy-decoded attributes (3022). According to embodiments, the attribute decoding may include at least one or a combination of RAHT coding, predicting transform coding, or lifting transform coding. The point cloud reception device may generate an LOD based on the reconstructed geometry information (an octree). In addition, the point cloud reception device obtains signaling information including the information about the maximum nearest neighbor distance described with reference to FIGS. 25 to 29, and generates a neighbor point set according to the maximum nearest neighbor distance calculation method described in FIGS. 20 to 24, based on the obtained signaling information. The description of the method of generating the neighbor point set and the method of calculating the maximum nearest neighbor distance is the same as those of FIGS. 20 to 29.

The point cloud reception device processes the decoded attribute (3023). For example, when the point cloud transmission device performs color transform on the attribute, the point cloud reception device performs inverse color transform on the attribute and outputs the attribute.

Figure 31:
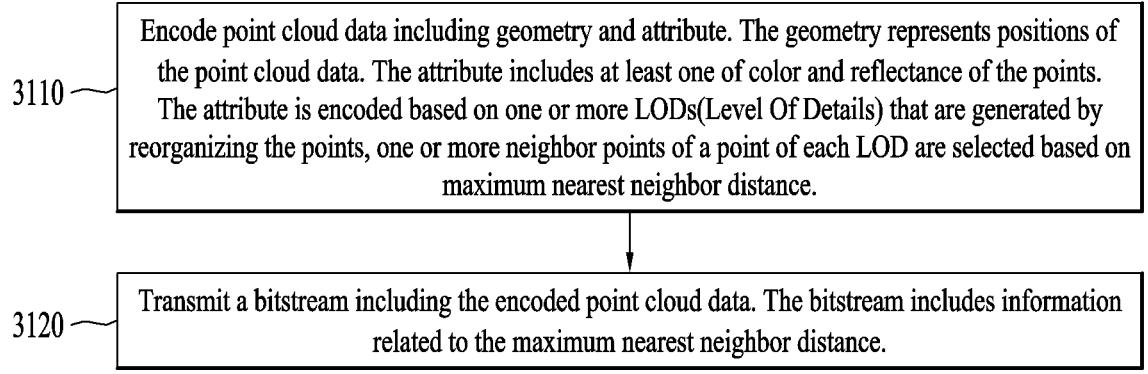
FIG. 31 is a flow diagram illustrating a point cloud data transmission method according to embodiments.

FIG. 31 is a flow diagram illustrating a point cloud data transmission method according to embodiments.

The flow diagram 3100 of FIG. 31 represents a point cloud data transmission method for the point cloud data transmission device described with reference to FIGS. 1 to 30 (e.g., the transmission device or point cloud encoder described with reference to FIGS. 1, 12 and 14). The flow diagram of FIG. 31 is intended to illustrate the point cloud data transmission method, and the order of the operations in the point cloud data transmission method is not limited to the order shown in the figure.

The point cloud data transmission device encodes point cloud data including geometry and an attribute (3110). The geometry is information indicating positions of points of the point cloud data, and the attribute includes at least one of a color and reflectance of the points. The attribute is encoded based on one or more levels of detail (LODs) generated by reorganizing the points, and one or more neighbor points around a point belonging to each LOD are selected based on the maximum nearest neighbor distance. The maximum nearest neighbor distance is the same as that described with reference to FIGS. 15 to 30, and thus description thereof is skipped. The point cloud data transmission device encodes the geometry and attribute as described with reference to FIGS. 1 to 14. The point cloud data transmission device (or attribute encoder) may generate one or more LODs based on the octree of the encoded geometry and perform predicting transform based on the selected one or more neighbor points. As described with reference to FIGS. 15 to 30, the distance between each neighbor point and a predicting transform target point is less than the maximum nearest neighbor distance or equal to the maximum nearest neighbor distance. The one or more LODs are generated based on the octree of the geometry. According to embodiments, the octree has one or more depths as described with reference to FIG. 6. Accordingly, the level of each LOD corresponds to each depth or one or more depths of the octree. In addition, as described with reference to FIGS. 5 to 7, the octree includes one or more octree nodes. The maximum nearest neighbor distance is expressed as $2^{LOD^2} \times 3 \times NN\_range$. Here, LOD is a parameter indicating the level of the LOD to which the predicting transform target point belongs, and NN_range is the neighbor point search range described with reference to FIGS. 15 to 30. NN_range indicates the number of one or more octree nodes around the point. The description of the neighbor point search range is the same as that of FIGS. 15 to 30, and is thus skipped.

The point cloud data transmission device transmits a bitstream containing encoded point cloud data. The bitstream (e.g., the bitstream described with reference to FIG. 25) contains information related to the maximum nearest neighbor distance (e.g., the SPS and APS syntaxes described with reference to FIGS. 26 to 30). According to embodiments, the information related to the maximum nearest neighbor distance includes nearest_neighbour_max_range. That is, as described with reference to FIGS. 26 to 30, the information related to the maximum nearest neighbor distance may be transmitted at the sequence level or the slice level.

Figure 32:
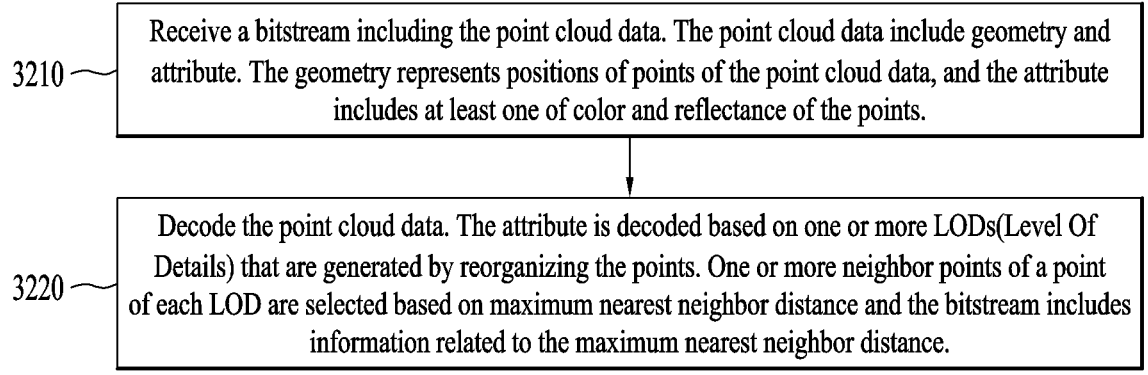
FIG. 32 is a flow diagram illustrating a method of processing point cloud data according to embodiments.

FIG. 32 is a flow diagram illustrating a method of processing point cloud data according to embodiments.

The flow diagram 3200 of FIG. 32 shows a point cloud data processing method of the point cloud data processing device described with reference to FIGS. 1 to 30 (for example, the reception apparatus 10004 or the point cloud video decoder 10006). The flow diagram of FIG. 32 is intended to illustrate the point cloud data processing method, and the order of the operations in the point cloud data processing method is not limited to the order shown in the figure.

The point cloud data processing device (for example, the receiver of FIG. 1, the receiver of FIG. 13) receives a bitstream containing point cloud data including geometry and an attribute (3210). The geometry is information indicating positions of points of the point cloud data, and the attribute includes at least one of a color and reflectance of the points.

The point cloud data processing device (for example, the decoder of FIG. 10) decodes the point cloud data (3220). The attribute is decoded based on one or more levels of detail (LODs) generated by reorganizing the points, and one or more neighbor points around a point belonging to each LOD are selected based on the maximum nearest neighbor distance. The maximum nearest neighbor distance is the same as that described with reference to FIGS. 15 to 30, and thus description thereof is skipped. The point cloud data reception device (for example, the geometry decoder of FIG. 10) decodes the geometry included in the point cloud data. The point cloud data reception device (for example, the attribute decoder of FIG. 10) decodes the attribute. The point cloud data reception device generates one or more LODs based on the octree of the decoded geometry, and performs predicting transform on a point included in each LOD based on the selected one or more neighbor points. The distance between each neighbor point and a predicting transform target point is less than the maximum nearest neighbor distance or equal to the maximum nearest neighbor distance. The one or more LODs are generated based on the octree of the geometry. According to embodiments, the octree has one or more depths as described with reference to FIG. 6. Accordingly, the level of each LOD corresponds to each depth or one or more depths of the octree. In addition, as described with reference to FIGS. 5 to 7, the octree includes one or more octree nodes. As described with reference to FIGS. 15 to 30, the maximum nearest neighbor distance is calculated based on the neighbor point search range. The maximum nearest neighbor distance is expressed as $2^{LOD^2} \times 3 \times NN\_range$. Here, LOD is a parameter indicating the level of the LOD to which the predicting transform target point belongs, and NN_range is the neighbor point search range described with reference to FIGS. 15 to 30. NN_range indicates the number of one or more octree nodes around the point. The description of the neighbor point search range is the same as that of FIGS. 15 to 30, and is thus skipped.

The bitstream (e.g., the bitstream described with reference to FIG. 25) contains information related to the maximum nearest neighbor distance (e.g., the SPS and APS syntaxes described with reference to FIGS. 26 to 30). According to embodiments, the information related to the maximum nearest neighbor distance includes nearest_neighbour_max_range. That is, as described with reference to FIGS. 26 to 30, the information related to the maximum nearest neighbor distance may be transmitted at the sequence level or the slice level. Accordingly, the point cloud data reception device may perform attribute decoding based on the information related to the maximum nearest neighbor distance contained in the bitstream.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR INVENTION

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that various changes or modifications can be made to the embodiments within the scope of the embodiments.

Thus, it is intended that the embodiments cover the modifications and variations of this disclosure provided they come within the scope of the appended claims and their equivalents.

What is claimed is:

1. A method for transmitting point cloud data, the method comprising:
    encoding point cloud data including geometry and attribute, the geometry representing positions of points of the point cloud data and the attribute including at least one of color and reflectance of the points, wherein:
    the attribute is encoded based on one or more LODs (Level Of Details) that are generated by reorganizing the points, one or more neighbor points of a point of a LOD of the one or more LODs are selected based on a maximum neighbor distance; and
    transmitting a bitstream including the encoded point cloud data,
    wherein the maximum neighbor distance is generated based on a LOD and a neighbor search range for the point,
    wherein the maximum neighbor distance is represented as $2^{LoD^2} \times 3 \times \text{NN\_range}$, and
    wherein the LoD represents a level of LOD of the point, and the NN_range is a neighbor point search range that represents a number of one or more octree nodes around the point.

2. The method of claim 1, wherein the encoding the point cloud data includes:
   encoding the geometry; and
   encoding the attribute.

3. The method of claim 2, wherein the encoding the attribute includes:
   generating the one or more LODs; and
   performing prediction transformation based on the selected one or more neighbor points, wherein a distance between each of the one or more neighbor points and the point is less than or equal to the maximum neighbor distance.

4. The method of claim 3, wherein:
   levels of the one or more LODs correspond to depths of octree of the encoded geometry, the octree includes octree nodes.

5. The method of claim 1, wherein an attribute parameter set syntax in the bitstream includes information related to the maximum neighbor distance.

6. A method for processing point cloud data, the method comprising:
   receiving a bitstream including the point cloud data, the point cloud data including geometry and attribute, the geometry representing positions of points of the point cloud data, and the attribute including at least one of color and reflectance of the points; and
   decoding the point cloud data, wherein the attribute is decoded based on one or more LODs (Level Of Details) that are generated by reorganizing the points, one or more neighbor points of a point of a LOD of the one or more LODs are selected based on a maximum neighbor distance,
   wherein the maximum neighbor distance is generated based on a LOD and a neighbor search range for the point,
   wherein the maximum neighbor distance is represented as $2^{LoD^2} \times 3 \times NN\_range$, and
   wherein the LoD represents a level of LOD of the point, and the NN_range is a neighbor point search range that represents a number of one or more octree nodes around the point.

7. The method of claim 6, wherein the decoding the point cloud data includes:
   decoding the geometry; and
   decoding the attribute.

8. The method of claim 7, wherein the decoding the attribute includes:
   generating the one or more LODs; and
   performing prediction transformation based on the selected one or more neighbor points, wherein a distance between each of the selected one or more neighbor points and the point is less than or equal to the maximum neighbor distance.

9. The method of claim 8, wherein levels of the one or more LODs correspond to depths of octree of the decoded geometry, the octree includes octree nodes, the maximum neighbor distance is calculated based on neighbor point search range that represents a number of one or more octree nodes around the point.

10. The method of claim 6, wherein an attribute parameter set syntax in the bitstream includes information related to the maximum neighbor distance.

11. A device for processing point cloud data, the device comprising:
    a receiver to receive a bitstream including the point cloud data, the point cloud data including geometry and attribute, the geometry representing positions of points of the point cloud data, the attribute including at least one of color and reflectance of the points; and
    a decoder to decode the point cloud data, wherein the attribute is decoded based on one or more LODs (Level Of Details) that are generated by reorganizing the points, one or more neighbor points of a point of a LOD of the one or more LODs are selected based on a maximum neighbor distance,
    wherein the maximum neighbor distance is generated based on a LOD and a neighbor search range for the point,
    wherein the maximum neighbor distance is represented as $2^{LoD^2} \times 3 \times NN\_range$, and
    wherein the LoD represents a level of LOD of the point, and the NN_range is a neighbor point search range that represents a number of one or more octree nodes around the point.

12. The device of claim 11, wherein the decoder includes:
    a geometry decoder to decode the geometry; and
    an attribute decoder to decode the attribute.

13. The device of claim 12, wherein the attribute decoder is further configured to:
    generate the one or more LODs and perform prediction transformation based on the selected one or more neighbor points, wherein a distance between each of the selected one or more neighbor points and the point is less than or equal to the maximum neighbor distance.

14. The device of claim 13, wherein levels of the one or more LODs correspond to depths of octree of the decoded geometry, the octree includes octree nodes, the maximum neighbor distance is calculated based on neighbor point search range that represents a number of one or more octree nodes around the point.

15. The device of claim 11, wherein an attribute parameter set syntax in the bitstream includes information related to the maximum neighbor distance.

16. A device of transmitting point cloud data, the device comprising:
    an encoder configured to encode point cloud data including geometry and attribute, the geometry representing positions of points of the point cloud data and the attribute including at least one of color and reflectance of the points, wherein:
      the attribute is encoded based on one or more LODs (Level Of Details) that are generated by reorganizing the points, one or more neighbor points of a point of a LOD of the one or more LODs are selected based on a maximum neighbor distance; and
    a transmitter configured to transmit a bitstream including the encoded point cloud data,
    wherein the maximum neighbor distance is generated based on a LOD and a neighbor search range for the point,
    wherein the maximum neighbor distance is represented as $2^{LoD^2} \times 3 \times NN\_range$, and
    wherein the LoD represents a level of LOD of the point, and the NN_range is a neighbor point search range that represents a number of one or more octree nodes around the point.

\* \* \* \* \*